(12) United States Patent
Kitamura et al.

(10) Patent No.: US 10,713,972 B2
(45) Date of Patent: *Jul. 14, 2020

(54) JOB PROCEDURE DISPLAY APPARATUS, METHOD OF CONTROLLING JOB PROCEDURE DISPLAY APPARATUS AND NON-TRANSITORY, COMPUTER READABLE STORAGE MEDIUM

(71) Applicant: FUJITSU LIMITED, Kawasaki-shi, Kanagawa (JP)

(72) Inventors: Kazuki Kitamura, Kahoku (JP); Mitsutaka Kaneki, Kahoku (JP); Yuichiro Kitagawa, Kahoku (JP); Yasuo Hatanaka, Kahoku (JP); Hiroshi Kobayashi, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,447

(22) Filed: Jun. 20, 2019

(65) Prior Publication Data

US 2019/0304332 A1 Oct. 3, 2019

Related U.S. Application Data

(63) Continuation of application No. 13/344,834, filed on Jan. 6, 2012, now Pat. No. 10,373,514.

(30) Foreign Application Priority Data

Mar. 7, 2011 (JP) ................................ 2011-048464

(51) Int. Cl.
*G09B 19/00* (2006.01)
*G06Q 10/06* (2012.01)

(52) U.S. Cl.
CPC ............. *G09B 19/00* (2013.01); *G06Q 10/06* (2013.01)

(58) Field of Classification Search
USPC .... 434/219, 322, 323, 350; 700/24, 83, 100, 700/108, 111; 705/7.15, 7.42, 7.26
See application file for complete search history.

(56) References Cited

U.S. PATENT DOCUMENTS

| 2003/0085927 | A1* | 5/2003 | Muller | G06F 3/0481 715/810 |
| 2006/0101467 | A1* | 5/2006 | Buco | G06F 9/5038 718/102 |

(Continued)

FOREIGN PATENT DOCUMENTS

| JP | 04-023232 U | 2/1992 |
| JP | 07-182215 | 7/1995 |

(Continued)

OTHER PUBLICATIONS

Japanese Office Action dated Sep. 2, 2014 in corresponding Japanese Patent Application No. 2011-048464.

(Continued)

*Primary Examiner* — Mark A Fleischer
(74) *Attorney, Agent, or Firm* — Staas & Halsey LLP

(57) ABSTRACT

An apparatus displaying a job screen indicating a job procedure, has a management unit that manages a job and a plurality of processes, a monitor unit that monitors an operation of an operator, a recorder unit that records an address of a job, an instructing unit that retrieves an address in response to a notification, determines whether to update the retrieved address in response to a type of a notified operation, and stores the updated address when the retrieved address has been updated, a storage unit that stores the job screen, and a control unit that reads the job screen and controls the read job screen, wherein the management unit retrieves the updated address, and instructs the display (Continued)

control unit to display the job screen, and wherein the display control unit reads out the instructed job screen.

18 Claims, 25 Drawing Sheets

(56) References Cited

U.S. PATENT DOCUMENTS

| | | | | |
|---|---|---|---|---|
| 2007/0036117 A1* | 2/2007 | Taube | ...................... | H04L 67/18 |
| | | | | 370/338 |
| 2009/0210282 A1* | 8/2009 | Elenbaas | ................. | G06Q 10/06 |
| | | | | 705/7.13 |
| 2009/0296131 A1* | 12/2009 | Yoshida | ............... | H04N 1/0035 |
| | | | | 358/1.15 |
| 2009/0318074 A1 | 12/2009 | Burge et al. | | |
| 2013/0096972 A1* | 4/2013 | Podgurny | ............... | G06Q 10/06 |
| | | | | 705/7.15 |

FOREIGN PATENT DOCUMENTS

| | | |
|---|---|---|
| JP | 2513890 | 7/1996 |
| JP | 2002-366216 | 12/2002 |

OTHER PUBLICATIONS

Office Action for co-pending U.S. Appl. No. 13/344,834, dated Jul. 19, 2013.
Final Office Action for co-pending U.S. Appl.. No. 13/344,834, dated Jan. 7, 2014.
Office Action for co-pending U.S. Appl. No. 13/344,834, dated Apr. 6, 2015.
Final Office Action for co-pending U.S. Appl. No. 13/344,834, dated Oct. 22, 2015.
Office Action for co-pending U.S. Appl. No. 13/344,834, dated Sep. 23, 2016.
Office Action for co-pending U.S. Appl. No. 13/344,834, dated Jun. 8, 2017.
Final Office Action for co-pending U.S. Appl. No. 13/344,834, dated Nov. 29, 2017.
Final Office Action for co-pending U.S. Appl. No. 13/344,834, dated Jun. 1, 2018.
Office Action for co-pending U.S. Appl. .No. 13/344,834, dated Aug. 13, 2018.
U.S. Appl. No. 13/344,834, filed Jan. 6, 2012, Kazuki Kitamura, et al., Fujitsu Limited.

* cited by examiner

FIG. 9

| TABLE OF CONTENT CODES 231 | | | |
|---|---|---|---|
| PROCESS 1 | A | B | C | |
| PROCESS 2 | D | E | F | G |
| PROCESS 3 | H | I | | |
| PROCESS N | J | K | L | |

| WORK DAY | WORK TIME | DRAWING NO. | SERIAL NO. | OPERATION SIGNAL | PROCESS ADDRESS n | JOB ADDRESS m | OPERATOR NAME |
|---|---|---|---|---|---|---|---|
| 2/1 | 10:00 | 0001 | 3 | NEXT JOB | n | m | AB C |
| | | | | | | | |
| | | | | | | | |
| | | | | | | | |
| | | | | | | | |

JOB PROCEDURE DISPLAY APPARATUS, METHOD OF CONTROLLING JOB PROCEDURE DISPLAY APPARATUS AND NON-TRANSITORY, COMPUTER READABLE STORAGE MEDIUM

CROSS-REFERENCE TO RELATED APPLICATION

This application is a continuation of U.S. application Ser. No. 13/344,834 filed Jan. 6, 2012, which is based upon and claims the benefit of priority of the prior Japanese Patent Application No. 2011-048464, filed on Mar. 7, 2011, the entire contents of which are incorporated herein by reference.

FIELD

The embodiments described herein are related to a job procedure display apparatus and a job management apparatus.

BACKGROUND

In the discussion that follows, a "display apparatus" refers to not only a standalone display apparatus but also a system that includes a first apparatus having a display unit 12 and a second apparatus providing an instruction to the first apparatus to display information thereon. Furthermore, the "display apparatus" refers to not only the apparatus having the display unit 12, but also a third "apparatus causing another apparatus to display information." The third apparatuses may include an apparatus that causes another apparatus having the display unit 12 to display information, and an apparatus that transfers, to the apparatus having the display unit 12, information to be displayed thereon.

In the assembly of a product, operators are supplied with a job procedure manual and a variety of documentations in order to teach the operators a variety of job procedures and contents of jobs.

Electronic apparatuses are now considered. A plurality of processes and jobs are typically performed in the assembly of an electronic apparatus. For example, several tens of processes are performed in the assembly of a large-scale apparatus. Each operator checks the content of each job viewing the documentations such as a work manual or a job procedure manual, each specifying a job procedure in each process, and performs an assembly job in accordance with the procedure described in the job procedure manual. Described in the job procedure manual is a description of an item each operator takes note of in addition to drawings and photographs of an apparatus to be assembled.

The word "job" here refers to each assembly job the operator is supposed to do, and the word "process" includes a plurality of related jobs, and refers to a series of jobs as a set. For example, a series of jobs mounting a unit called A onto an apparatus is referred to as a "process," and each job, included in the process, mounting the unit A onto the apparatus is referred to as a "job." The job may be an assembly job of arranging the unit A on the apparatus, or of securing the unit A onto the apparatus with a screw.

The following discussion focuses on the job procedure of the assembly job, and is not intended to limit the job type of the embodiments.

The related art technique described above is disclosed in Japanese Patent No. 2513890.

The job procedure manual may be in the form of a book into which sheets of paper or other type of sheets are bound. The job procedure is typically viewed with the job procedure manual laid and opened on a desk, for example. Space to accommodate the job procedure manual may be arranged in a work place. The work place is typically not wide enough. In view of the efficiency of job, the space available for the job procedure manual is limited. The work place of the assembly job may be too narrow to accommodate the job procedure manual. If the job procedure manual is placed at a location different from the work place, an operator has difficulty viewing the job procedure manual without moving away from the work place. This arrangement causes a difficulty for the user to reference the job procedure manual, thereby reducing the efficiency of assembly job.

The operator typically turn pages of the job procedure manual as a job is in progress. Page turning may reduce the efficiency of assembly job. In particular, when an operator wears gloves, or holds a tool, page turning of the job procedure manual is difficult.

The job procedure manual is typically prepared on a per assembly product basis. Each time a different product is introduced, the job procedure manual in use is also changed accordingly. Even if products of the same type are continuously assembled, product specifications may be different because of a difference in apparatus or unit. Since the job procedure of assembly changes from product to product, a different job procedure manual complying with a different job procedure may be used.

SUMMARY

According to an aspect of the embodiment, a job procedure display apparatus displaying a job screen indicating a job procedure, includes a management unit that manages a job and a plurality of processes, each of the processes including at least one job, in accordance with a process address indicating an order of the plurality of processes and a job address indicating an order of the job included in a process, a monitor unit that monitors an operation of an operator, a recorder unit that records an address of a job corresponding to the displayed job screen, an instructing unit that retrieves an address from the recorder unit in response to a notification from the monitor unit, determines whether to update the retrieved address in response to a type of a notified operation, and stores the updated address on the recorder unit if the retrieved address has been updated, a storage unit that stores the job screen, and a display control unit that reads the job screen from the storage unit and display-controls the read job screen, wherein the management unit retrieves the updated address from the recorder unit, and instructs the display control unit to display the job screen corresponding to the retrieved address, and wherein the display control unit reads out from the storage unit the instructed job screen corresponding to the retrieved address.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 illustrates a content code table.

FIG. 12 illustrates a content of a performance record of the embodiment.

DESCRIPTION OF EMBODIMENTS

The embodiments are described below with reference to the drawings.

Figure 1:
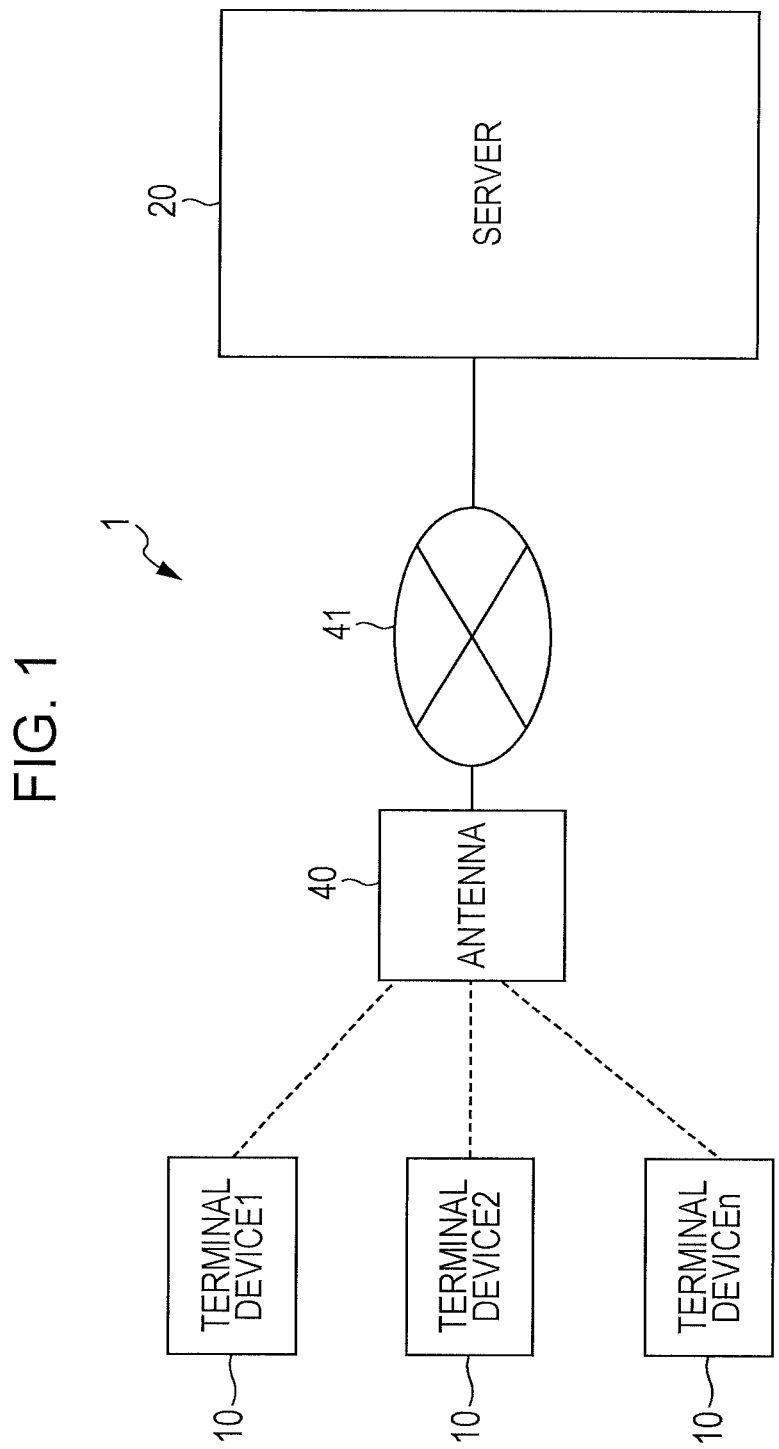
FIG. 1 illustrates a display apparatus of one embodiment.

FIG. 1 illustrates a display apparatus 1 of one embodiment.

The display apparatus 1 of the embodiment includes a portable terminal device 10 with a display unit 12 (hereinafter referred to as a terminal device) having a wireless communication function, and a server 20 performing wireless communication with the terminal device 10.

The server 20 is connected to an antenna 40 for wireless communication via a network 41. The server 20 communicates with the terminal device 10 via the antenna 40. There is a transceiver for executing data transmitting via the antenna 40.

FIG. 1 illustrates a total of n terminal devices 10 in operation, i.e., terminal device 1 through terminal device n. FIG. 1 is not intended to limit the number of terminal devices and display units.

Figure 2:
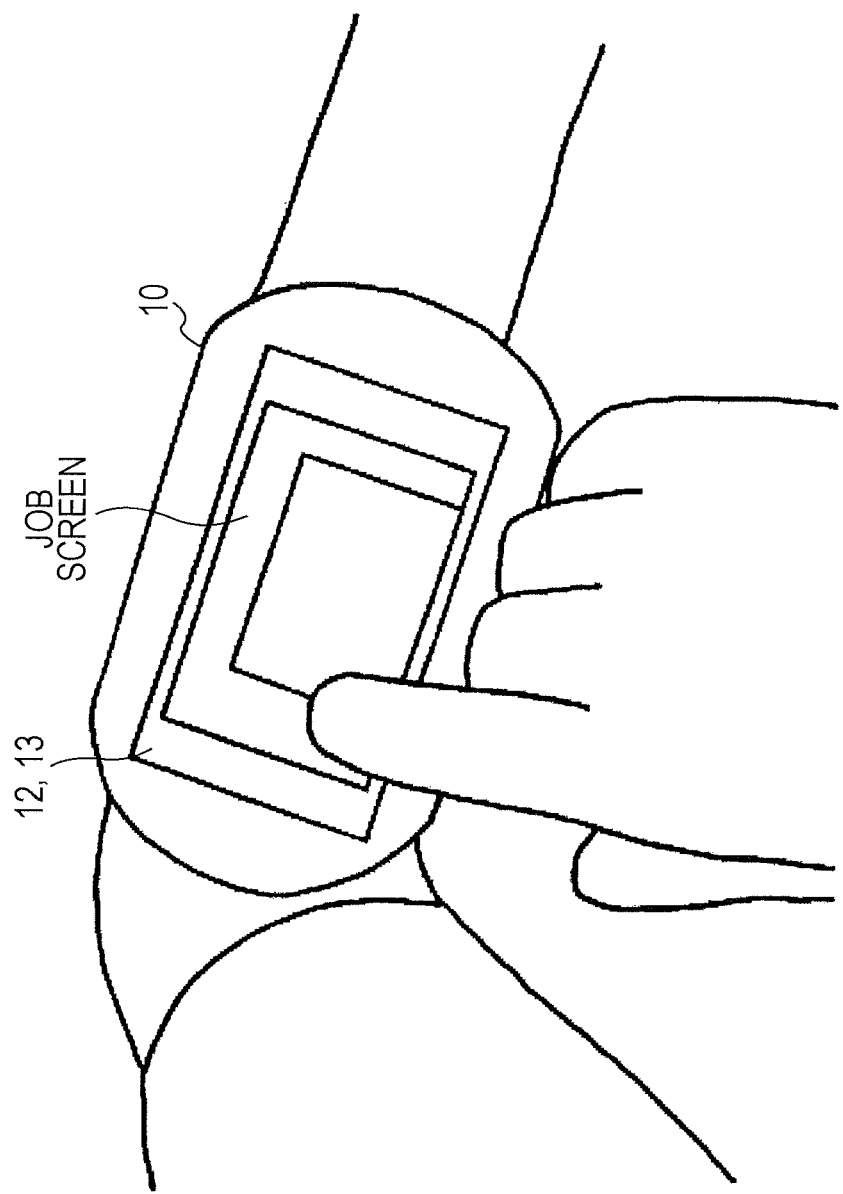
FIG. 2 is an external view of a terminal device of the embodiment.

FIG. 2 is an external view of the terminal device 10.

In view of ease of use, the terminal device 10 is furnished with a belt such that an operator wears the terminal device 10 on their wrist. The terminal device 10 includes on the front face thereof the display unit 12 displaying a job screen. The job screen displays a job procedure, and also displays images including photographs and drawings. Also displayed on the job screen are instructions and notes to an operator as appropriate.

To help the operator for operating the terminal device 10, the display unit 12 includes a touch panel 13. The use of the touch panel 13 sets the operator free from operating a mouse and a keyboard to check the job procedure, and increases the job efficiency. Since the touch panel 13 itself is based on related art, no detailed explanation about the touch panel 13 is provided herein.

Figure 3:
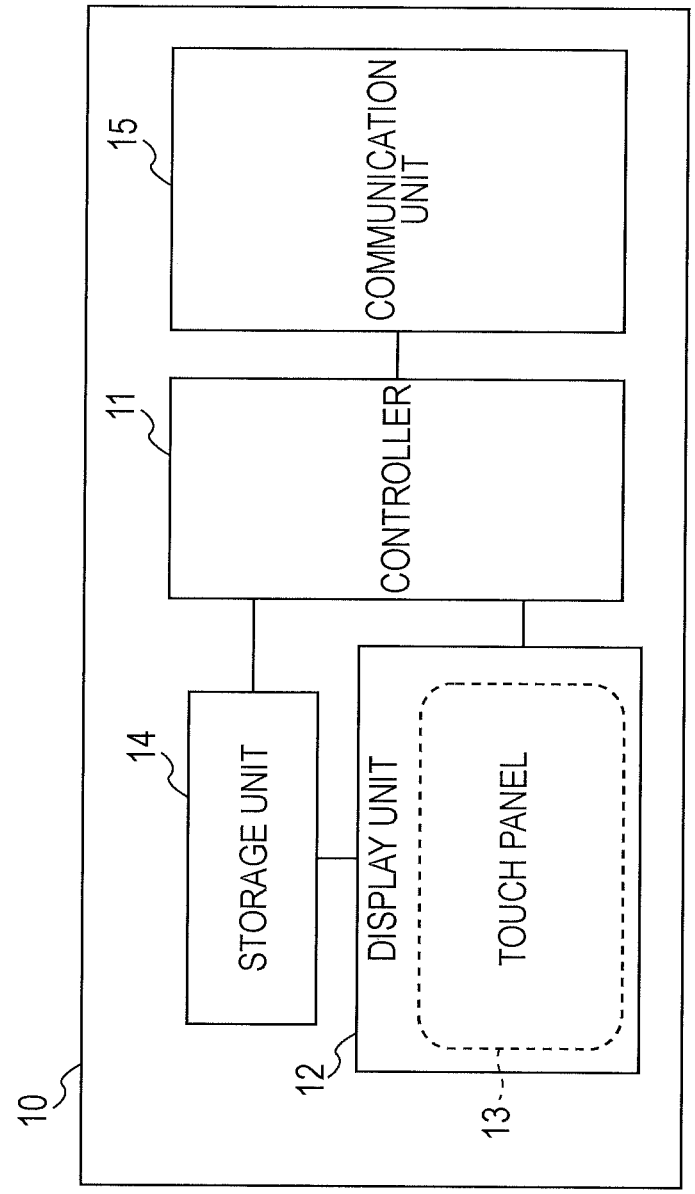
FIG. 3 is a functional block diagram of the terminal device.

FIG. 3 is a functional block diagram of the terminal device 10. The terminal device 10 is generally controlled in operation by a processor arranged therewithin. The processor is hereinafter referred to as a "controller 11."

The terminal device 10 includes a storage unit 14. The storage unit 14 stores identification information identifying the host device.

The controller 11 wirelessly communicates with an external apparatus such as the server 20 via a communication unit 15. The controller 11 temporarily stores on the storage unit 14 information such as an image retrieved from the server 20 via wireless communication, and controls the display unit 12 to display the information stored on the storage unit 14.

The controller 11 monitors an operation status of the touch panel 13. When the touch panel 13 is operated by the operator, the controller 11 identifies an instruction and job content of the operator depending on the operation location of the touch panel 13, and notifies the server 20 of the job content.

Figure 4:
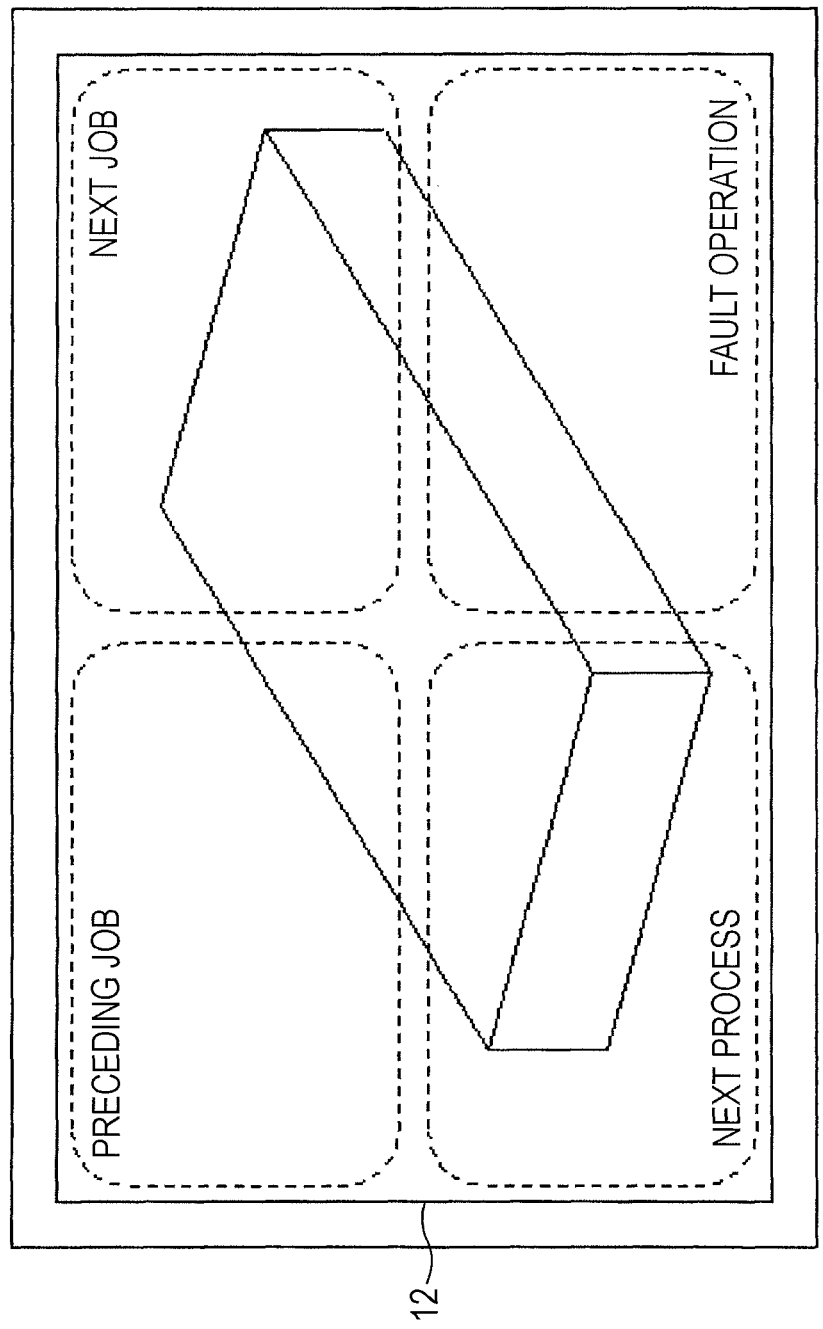
FIG. 4 diagrammatically illustrates a display unit and a touch panel of the terminal device.

FIG. 4 diagrammatically illustrates the display unit 12 and the touch panel 13 in the terminal device 10.

The terminal device 10 displays the information such as an image received from the server 20. FIG. 4 illustrates the display unit 12 that displays an image indicating a job procedure. Depending on the progress of the job, the operator operates the touch panel 13 to move the screen forward or backward presented on the display unit 12.

The touch panel 13 is divided into four regions as illustrated in FIG. 4. The touch panel 13 of FIG. 4 includes the four regions, i.e., a "preceding job," a "next job," a "next process," and a "fault operation." The operator operates the touch panel 13 responsive to desired job content to specify the desired job content. Each region is enclosed by broken-line outline. In practice, however, the outline of each region is not displayed on the display unit 12. The broken line outline is illustrated for illustrative purposes.

The "preceding job" region is selected by the operator when the operator wishes to check a job screen displayed on the display unit 12 prior to the job screen presently displayed. The "next job" region is selected by the operator when the operator wishes to display on the display unit 12 a screen of a next job within the same process placed subsequent to the job screen presently displayed.

The "next process" region is selected by the operator when the operator wishes to display and check a screen of a process subsequent to the process to which the job of the job screen presently displayed on the display unit 12 belongs. The "next process" region is also selected when the operator has completed the procedure of the present process.

The "fault operation" region is selected by the user when any fault occurs in the assembly job. If the "fault operation" region is selected, the job screen being displayed on the display unit 12 then quits, and is replaced with a fault operation screen of FIG. 5.

Figure 5:
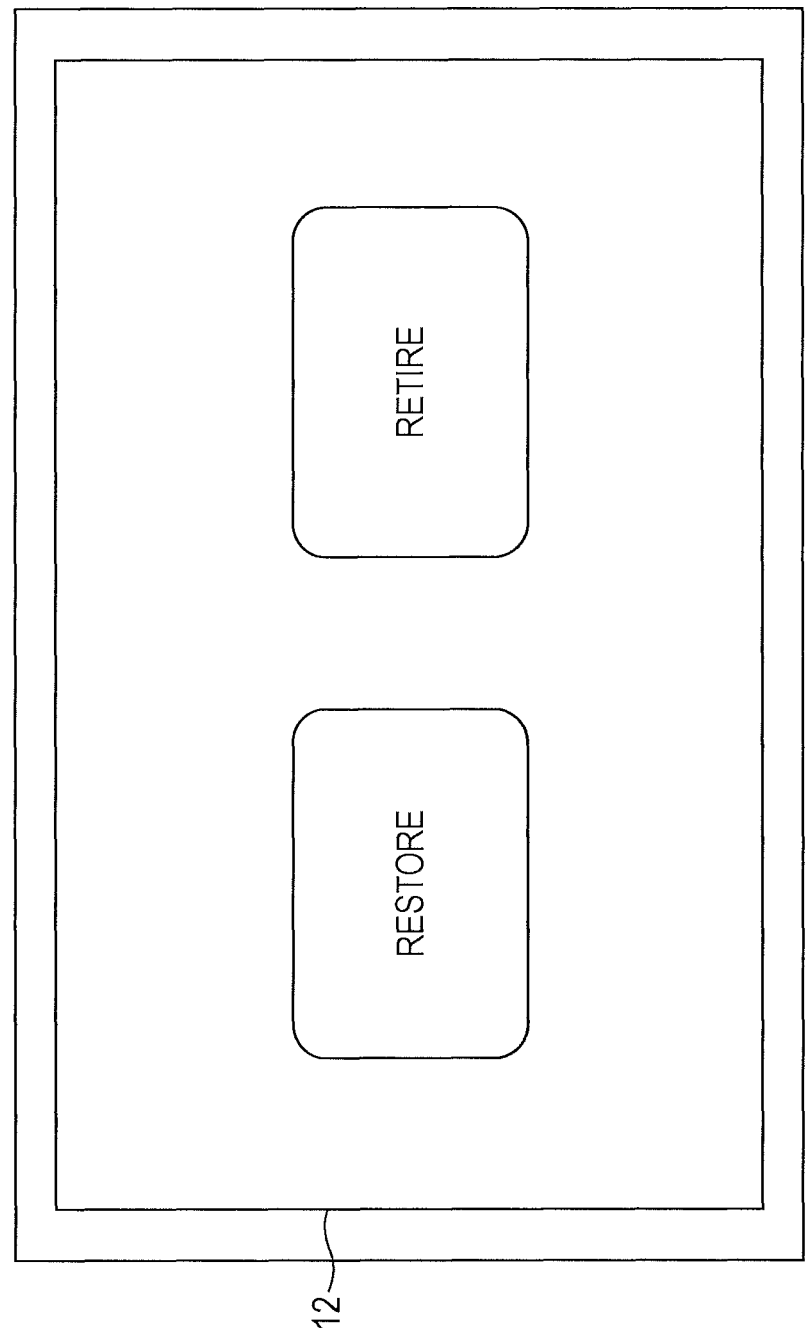
FIG. 5 illustrates a fault operation screen.

A "restore" region of FIG. 5 is selected by the operator when the fault is corrected in any way after the fault operation screen is displayed, i.e., the fault occurs in the job. In response to an instruction from the server 20, the display unit 12 reverts back to the job screen displayed heretofore.

A "retire" region of FIG. 5 is selected by the user when a product in the middle of the assembling is to be removed from an assembly line because the fault is difficult to clear. The series of operations is terminated in this case.

Since the terminal device 10 is worn by the operator as described above, the size of the screen is limited. The operator with gloves is unable to perform a delicate operation. As illustrated in FIG. 4, the four regions, i.e., the "preceding job" region, the "next job" region, the "next process" region, and the "fault operation" region are set on the terminal device 10 of the embodiment with a view to arranging a wide region for the touch panel 13 corresponding to each instruction. With the number of screen segments being four or so, the operator intuitively recognizes the position of the touch panel 13 to be selected.

Figure 6:
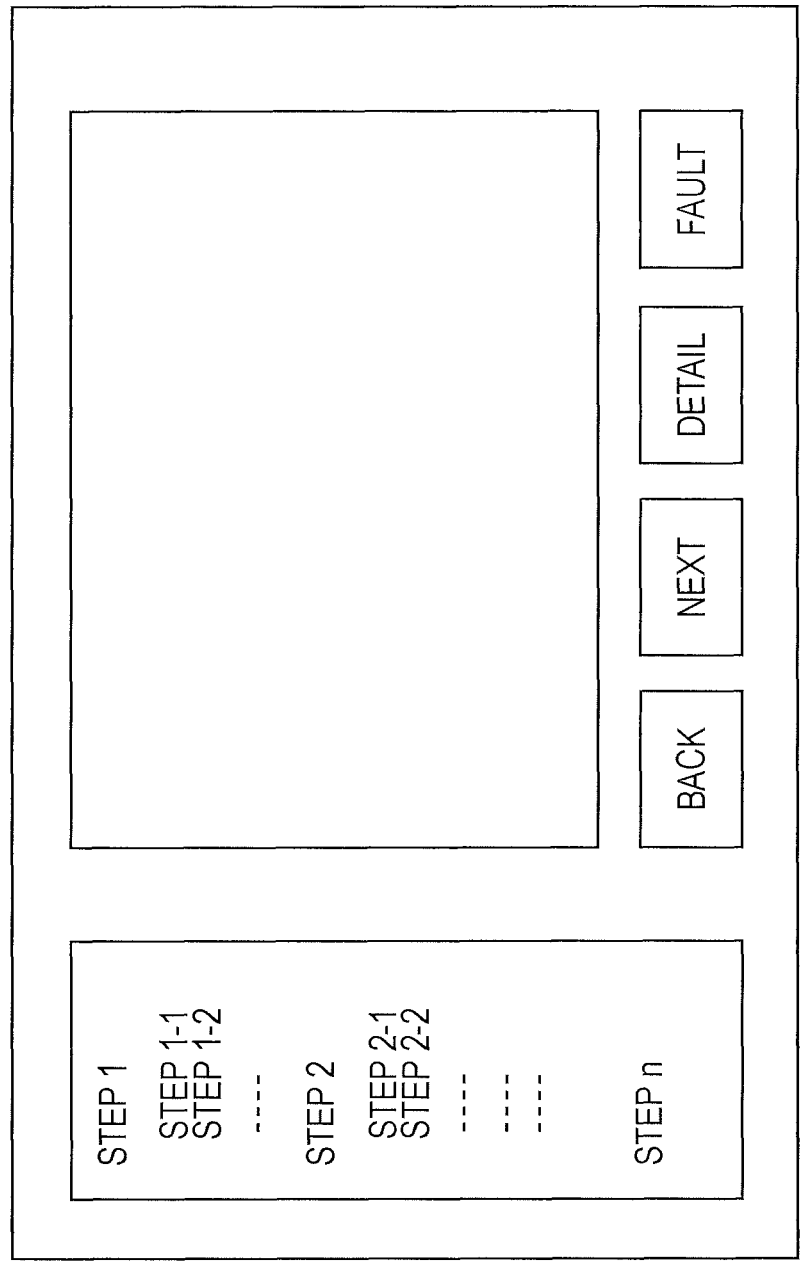
FIG. 6 illustrates another screen displayed on the display unit.

Since the size of the screen of the terminal device 10 is small, no sufficient margin is provided for the job screen. As illustrated in FIG. 6, a button image for operation may be displayed on a screen separate from a screen for procedure steps on the display unit 12, or an index representing a structure of the job procedure manual may be displayed in a tree. In the terminal device 10 of the embodiment, however, the display unit 12 does not display the button image and the index, and presents the job screen on the entire screen. If the screen has a margin, the screen structure of FIG. 6 may be optionally used.

The term "preceding job" is illustrated in FIG. 4 to simply indicate the content of the region. The screen of the terminal device 10 may be without such a term indicating the content of the region. The displaying of other information to the terminal device 10 is to be restrained to help the operator easily recognize the displayed job screen. No job screen is displayed in the fault operation screen of FIG. 5. The terms "restore" and "retire" are clearly displayed in order to cause the operator to understand a responsive operation to a fault.

The controller 11 recognizes coordinates and position of an operation on the touch panel 13. The controller 11 thus determines an instruction content assigned to the operation position on the touch panel 13. If the top left region of the touch panel 13 of FIG. 4 is selected by the operator, the controller 11 determines that the "preceding job" has been specified. The controller 11 then transmits to the server 20 a notification, indicating the instruction content thus determined, together with identification information identifying the terminal device 10.

Upon receiving the information transmitted from the server 20 to the host terminal device, the controller 11 performs an operation responsive to the received information.

Figure 7:
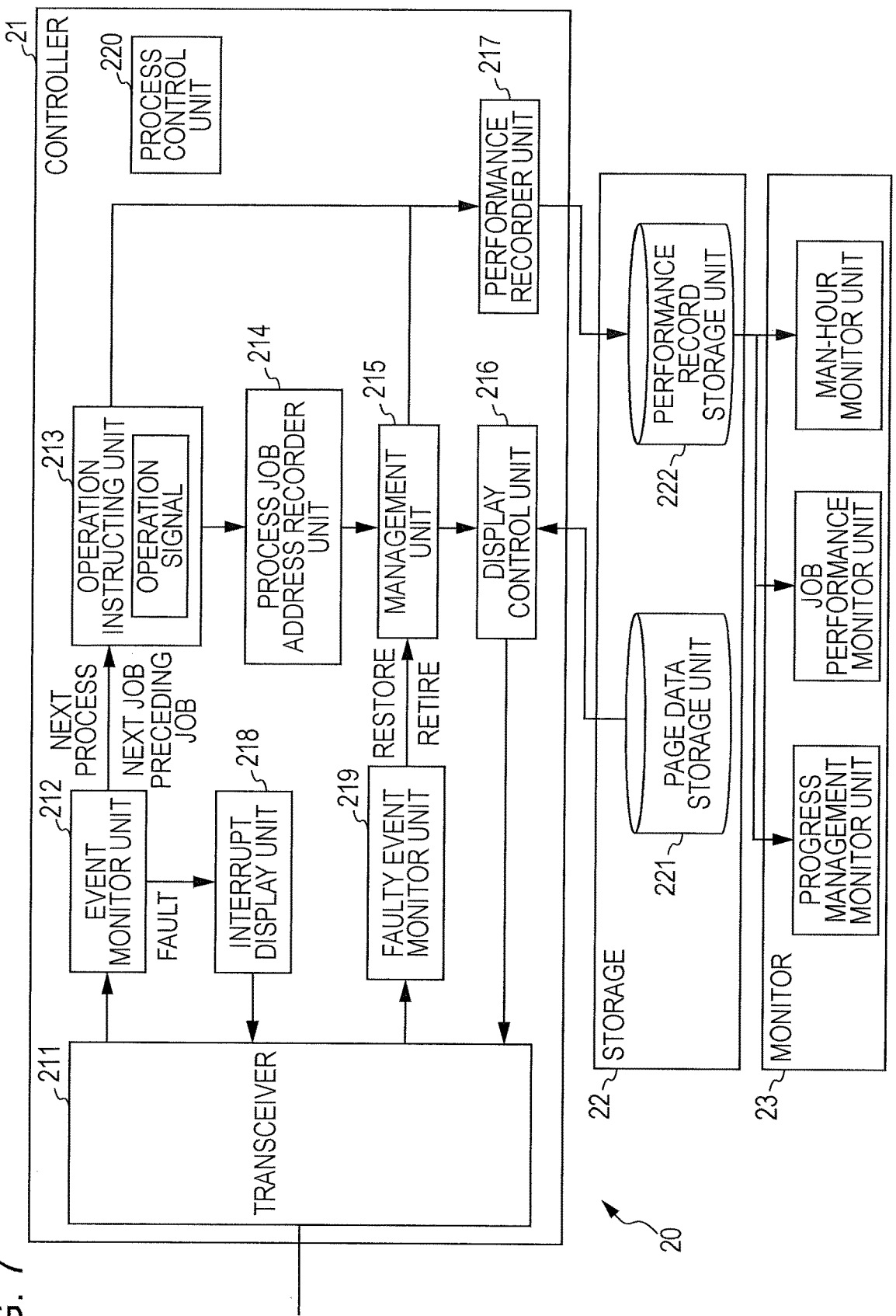
FIG. 7 is a block diagram of a server.

FIG. 7 illustrates a structure of the server 20 of the embodiment. The name "server 20" used here is meant to indicate an apparatus that supplies the terminal device 10 with information, in particular, a job screen. The server 20 is not limited to a so-called "server computer." Another type of apparatus may be used as the server in the embodiment.

The server 20 is functionally divided into a controller 21, a storage 22, and a monitor 23. The controller 21 executes and controls major functions of the server 20. For example, a processor executes software programs, thereby implementing the function of each element of the server 20. The server 20 of FIG. 7 is described in terms of elements and operations. This does not exclude the possibility that an element and an operation, unrelated to the elements and the operations related to displaying the job screen and the process management, are present in the server 20.

The storage 22 is an element storing a variety of information. The storage 22 may include a storage device of related art such as a disk device. The storage 22 includes a page data storage unit 221 and a performance record storage unit 222 as the elements related to the embodiment.

The monitor 23 includes a progress management monitor unit that manages progress of the assembly by referencing a performance record stored on the performance record storage unit 222, a job performance monitor unit that checks the performance record of the job, and a man-hour monitor unit that counts man-hours of each job.

The controller 21 in the server 20 includes a transceiver 211 that wirelessly communicates with the terminal device 10. Information and a notification received from the terminal device 10 via the transceiver 211 are inputted to the event monitor unit 212 and fault event monitor unit 219.

Each of the event monitor unit 212 and the fault event monitor unit 219 monitors a notification from the terminal device 10, i.e., monitors an event, and executes an operation responsive to the detected notification. The event monitor unit 212 monitors the notification when the job screen is displayed on the terminal device 10. The fault event monitor unit 219 monitors the notification when the fault operation screen is displayed on the terminal device 10.

The event monitor unit 212 monitors the notification from the terminal device 10, i.e., the occurrence of the events including the "preceding job," the "next job," the "next process," and the "fault operation."

If the notification of the "preceding job," the "next job," or the "next process" from the terminal device 10 is detected, the event monitor unit 212 transfers the detected notification to the operation instructing unit 213. If the notification of the "fault operation" is detected, the event monitor unit 212 notifies the operation instructing unit 213 of the detected notification of the fault operation.

Figure 8:
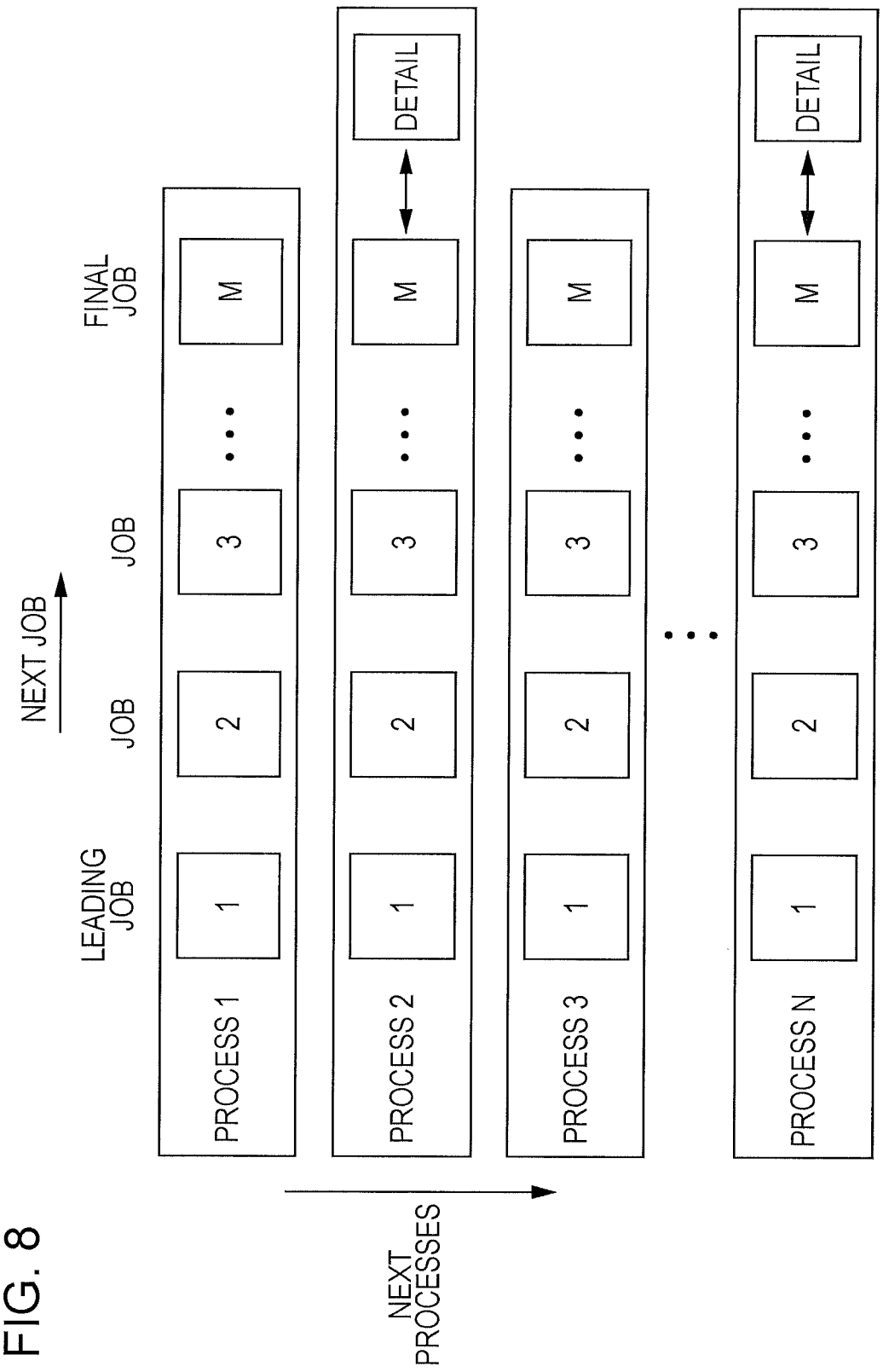
FIG. 8 diagrammatically illustrates a process job management performed by a management unit.

A management unit 215 manages mapping relation of each product between each process and each job included in the process. FIG. 8 diagrammatically illustrates the management of the process and job performed by the management unit 215.

The procedure of the product assembly is managed by drawing number of each product as an assembly target. The management unit 215 manages the procedures of the same drawing number by grouping the jobs included in each process by process unit. The management unit 215 thus logically manages the processes and the jobs included in each process in a matrix structure. Each job is accompanied by an address (n,m). In this case, "n" represents a process number that includes a job of interest, and "m" represents a position of the job of interest in the process n. As illustrated in FIG. 8, the process 1 through the process N are arranged in a first direction and the job 1 through the job M are arranged in a second direction. In the discussion that follows, the uppercase letter N represents the final process, and the uppercase letter M represents the final job in each process.

Depending on the process, the job screen indicating the procedure of the jobs is mapped to detailed information of the process. The detailed information may include quality information of the job, such as a past fault example in the process and notes about the process. Important information that the operator typically refers to in the job operation is presented on each job screen. On the other hand, knowhow information that the operator not necessarily but preferably refers to is separately arranged from the job screen of each job as the detailed information. As illustrated in FIG. 8, the process 2 and the process N are associated with the "detailed" information. The detailed information is grouped such that the detailed information is attached to the final job M of each process. The management unit 215 recognizes that "M" represents the final job, and that the "detailed" information is attached to the final job M.

FIG. 8 illustrates the process jobs corresponding to one drawing number. If products related to a plurality of drawing numbers are assembled in parallel, the management unit 215 expands and manages the procedures on a per drawing number basis of the products assembled in parallel. The management unit 215 also expands the procedures on a per operator basis. If different operators perform the assembly job related to the same drawing number, in other words if the assembly jobs are performed in parallel on a plurality of products, the management unit 215 expands the procedures on a per operator basis.

The procedure managed by the management unit 215 is used to identify the job screen in the position in a series of procedures in accordance with the operation of the terminal device 10. More specifically, when the terminal device 10 is operated, the procedure managed by the management unit 215 is used to identify whether the job screen displayed on the terminal device 10 corresponds to a job of the final process, or the final job or the leading job of a given process. The procedure managed by the management unit 215 is described more in detail together with an operational status of the terminal device 10.

The management unit 215 includes a content code table that manages each expanded job and a content code by linking the job to the content code. FIG. 9 illustrates the content code table.

An address is linked to a content code in the content code table of the embodiment such that the address of each process job is mapped to the content code indicating the job screen corresponding to each job. As illustrated in FIG. 9, alphabets represent content codes. As illustrated in FIG. 9, a content code "A" is assigned to a job at an address (1,1) and a content code "E" is assigned to a job at an address (2,2). The content code is used to retrieve the job screen from the page data storage unit 221 to be discussed later. No content code is assigned to a blank address in FIG. 9. In other words, no job is present at a blank address.

Figure 10:
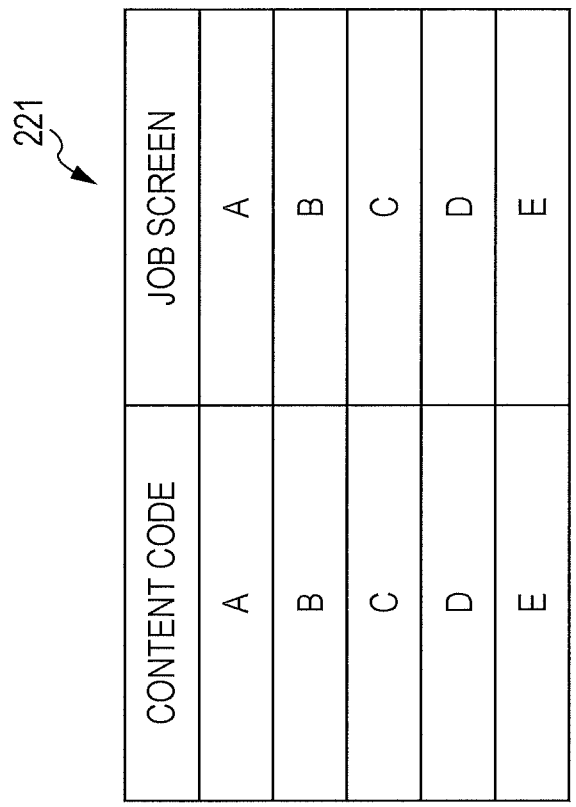
FIG. 10 illustrates a structure of a page data storage unit.

FIG. 10 illustrates the page data storage unit 221 storing the job screen. The page data storage unit 221 stores the job screen and the content code with the job screen mapped thereto.

When the display screen is to be updated or modified, the management unit 215 transfers to the display control unit 216 a content code corresponding to a job screen corresponding to a shift destination and an instruction to switch the job screen.

The display control unit 216 retrieves the job screen corresponding to the content code from the page data storage unit 221 in response to the content code managed by the management unit 215. The display control unit 216 transmits the retrieved job screen to the terminal device 10 via the transceiver 211, and instructs the terminal device 10 to display the job screen again.

The process job address recorder unit 214 stores, of the procedure managed by the management unit 215, an address of a job performed at a point of time, or an address of a job corresponding to the job screen displayed on the terminal device 10 at the point of time. An address stored on the process job address recorder unit 214 is updated in response to an operation of the terminal device 10.

In response to an event detected by the event monitor unit 212, the operation instructing unit 213 issues to each element in the server 20 instructions of operation actions including display control of the job screen. If the event detected by the event monitor unit 212 is one of the "preceding job," the "next job," and the "next process," the event monitor unit 212 retrieves the address recorded on the process job address recorder unit 214. The operation instructing unit 213 references the procedure managed by the management unit 215 and performs an operation such as updating the address retrieved from the process job address recorder unit 214. If the event detected by the event monitor unit 212 is the "fault operation," the operation instructing unit 213 instructs the interrupt display unit 218 to display a fault interrupt.

The operation instructing unit 213 performs an operation corresponding to the event detected by the fault event monitor unit 219.

In response to the instruction from the operation instructing unit 213, the interrupt display unit 218 instructs the terminal device 10 to display a fault operation screen.

In order to record an operation history of the terminal device 10 by the operator as a performance record in a control operation separate from control of the displaying of the job screen, the operation instructing unit 213 notifies the performance record recorder unit 217 of information related to the event detected by one of the event monitor unit 212 and the fault event monitor unit 219. In response to the notification from the operation instructing unit 213, the performance record recorder unit 217 stores the performance record on the performance record storage unit 222.

Figure 11:
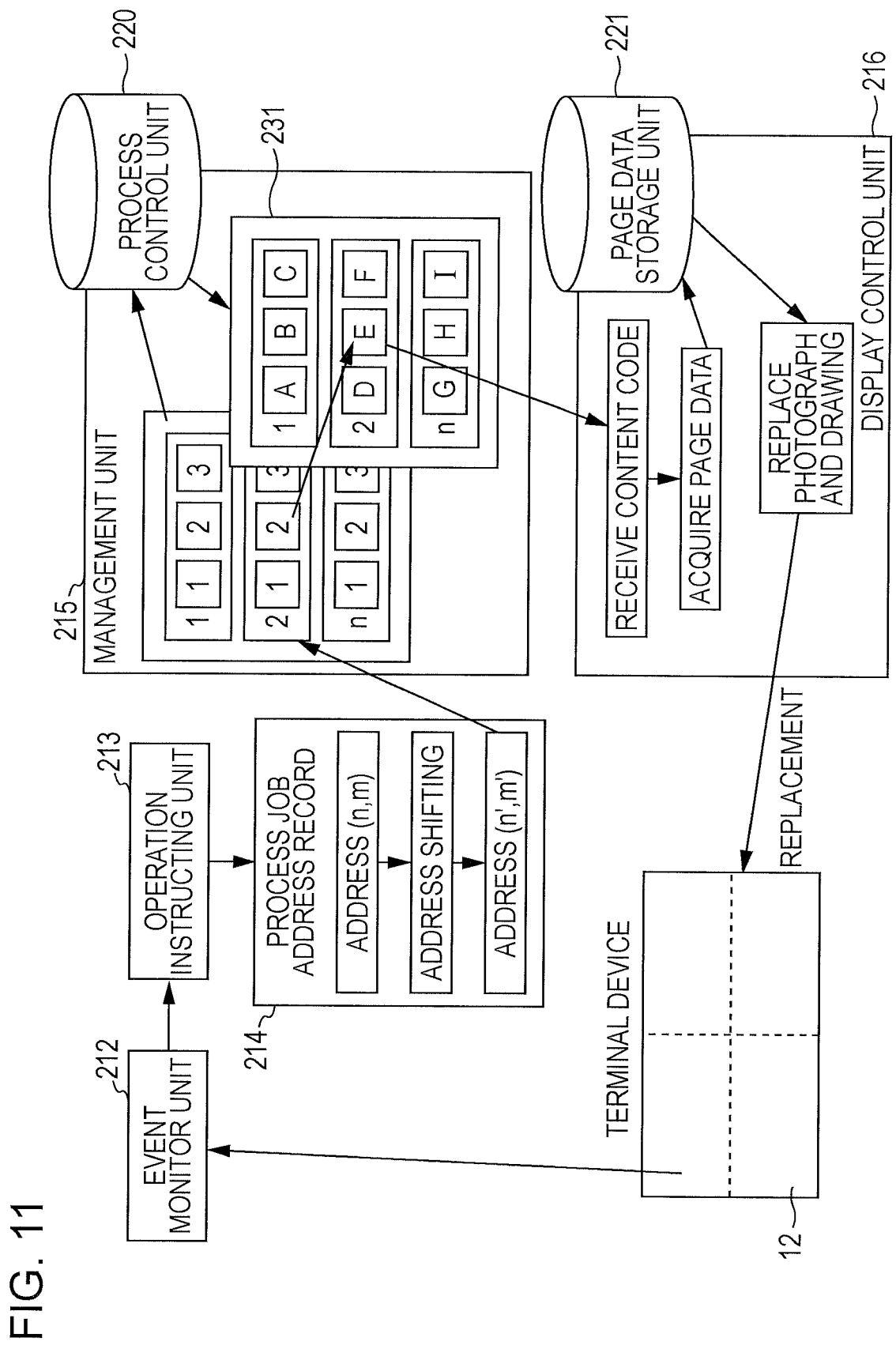
FIG. 11 is a flowchart illustrating a procedure of displaying a job screen.

FIG. 11 generally illustrates an operation of displaying the job screen.

When the touch panel 13 is operated on the terminal device 10, the event monitor unit 212 detects the generated event, and notifies the operation instructing unit 213 of the event. In response to the notification content, the operation instructing unit 213 updates the address recorded on the process job address recorder unit 214. The management unit 215 then references the process job address recorder unit 214, and recognizes the updated address.

The management unit 215 references process job management data stored on the process control unit 220, identifies the content code table corresponding to the process and job of the assembly performed on the terminal device 10, and retrieves the content code corresponding to the updated address. The retrieved content code is transferred to the display control unit 216.

The display control unit 216 references the page data storage unit 221, and retrieves page data corresponding to the content code received from the management unit 215, i.e., retrieves the job screen. The display control unit 216 replaces photograph and drawing, and transfers replacement screen information to the terminal device 10. Through this operation, the replacement job screen is displayed on the display unit 12 in the terminal device 10.

FIG. 12 illustrates a performance record stored on the performance record recorder unit 217.

The performance record of the embodiment maps pieces of information including "work day," "work time," "drawing number," "serial number," "operation signal," "process address," "job address," and "operator name."

A "work day" column indicates the day on which the job is performed, and a "work time" column indicates the time at which the job is performed. In the embodiment, the time and date on which the operator has operated the terminal device 10 are recorded in the "work time" and the "work day" columns, respectively. The notification of the "work day" and the "work time" may be transmitted from the terminal device 10 to the server 20. Alternatively, the server 20 may recognize the time at which the notification is received from the terminal device 10. In this case, the terminal device 10 is free from notifying the server 20 of information related to the time and date.

A "drawing number" column indicates a drawing number attached to a product as an assembly target, and in practice functions as information identifying an assembly target product. A "serial number" column indicates a particular number unique to a product out of products identified by the drawing number. Even if the products have the same drawing number, the job may be different from serial number to serial number. The "serial number" is recorded in the embodiment in order to manage the progress of the jobs of the products having the same drawing number and being assembled in parallel.

An "operation signal" column indicates a region where a signal outputted from the operation instructing unit 213 is stored. Output from the operation instructing unit 213 as the operation signals is information indicating the "preceding job," the "next job," the "next process," the "fault operation," the "restore" operation and the "retire" operation operated on the terminal device 10. The performance record recorder unit 217 records in the "operation signal" column the content indicated by the operation signal received from the operation instructing unit 213.

A "process address n" column and a "job address m" column indicate a process address and a job address as a shift destination to which the process and the job shift to as a result of the operation performed on the terminal device 10. In this case, the updated address of the process job address recorder unit 214 is recorded. For example, if the "next process" is selected with one of the jobs in the final process left uncompleted, no address is present as a shift destination. Information indicating the completion of the procedure is written at the process address and the job address.

An "operator name" column indicates the name of an operator who has performed the job, or identification information of the operator.

FIG. 12 is not intended to limit the type of information to be recorded as the performance record. Information not illustrated in FIG. 12 may be recorded as the performance record. Any of the information illustrated in FIG. 12 may not be recorded as the performance record.

The performance record of FIG. 12 may be used as process management information.

If a paper check sheet is used, it is difficult to instantly check the progress status of the assembly process. For example, a fault such as a job delay may occur. If the operator fails to warn another operator that the fault has occurred, the other persons including a supervisor supervising an assembly line have difficulty learning the occurrence of the fault.

In the embodiment, the operation history of the terminal device 10 is recorded as the performance record. The progress status of the job is thus easily checked. For example, if the time at which the "next process" is recorded is used as the performance record, a lead time between processes may be calculated. In the embodiment, a variety of information calculated as appropriate may be displayed in graph. The operator may thus learn the progress status of the assembly on a real-time basis. Early detection of a process fault and a timely response to the fault may be performed.

Figure 13:
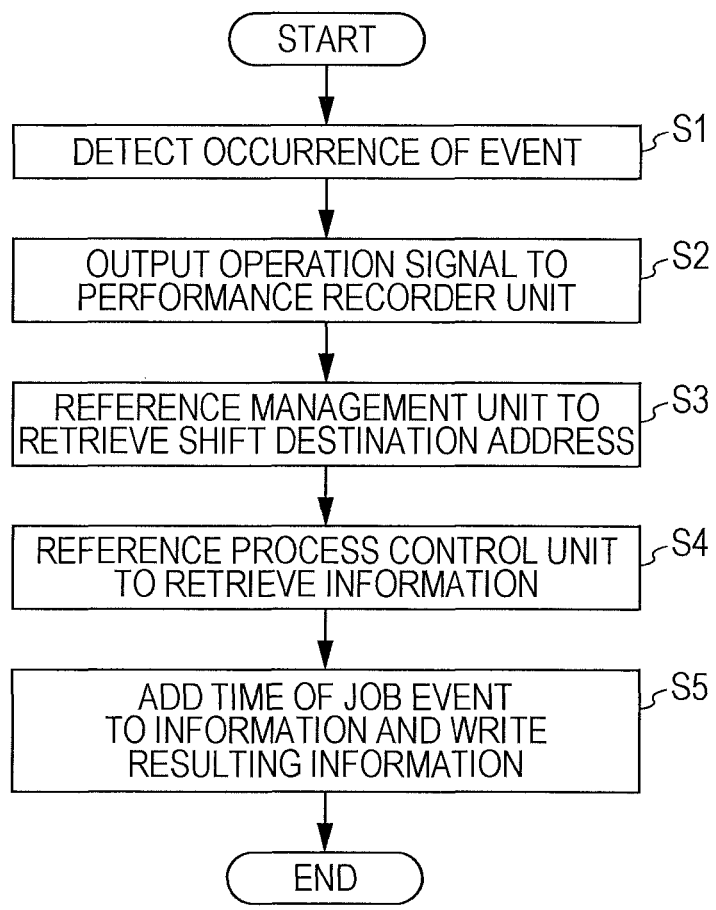
FIG. 13 is a flowchart illustrating a storage procedure of the performance record.

FIG. 13 is a flowchart illustrating an operation of storing a performance record on the performance record recorder unit 217.

If one of the event monitor unit 212 and the fault event monitor unit 219 detects the occurrence of an event (S1), an operation signal is outputted from the one of the operation instructing unit 213 and the fault event monitor unit 219 to the performance record recorder unit 217 (S2). Upon receiving the operation signal, the performance record recorder unit 217 retrieves a process job address (n,m) of a shift destination of an operation event by referencing the management unit 215 (S3). The performance record recorder unit 217 retrieves from the process control unit 220 apparatus information, process information and operator information related to the operation event (S4). The performance record recorder unit 217 then adds to the time of the occurrence of the operation event to the retrieved information and then writes the resulting information on the performance record storage unit 222 (S5).

Figure 14:
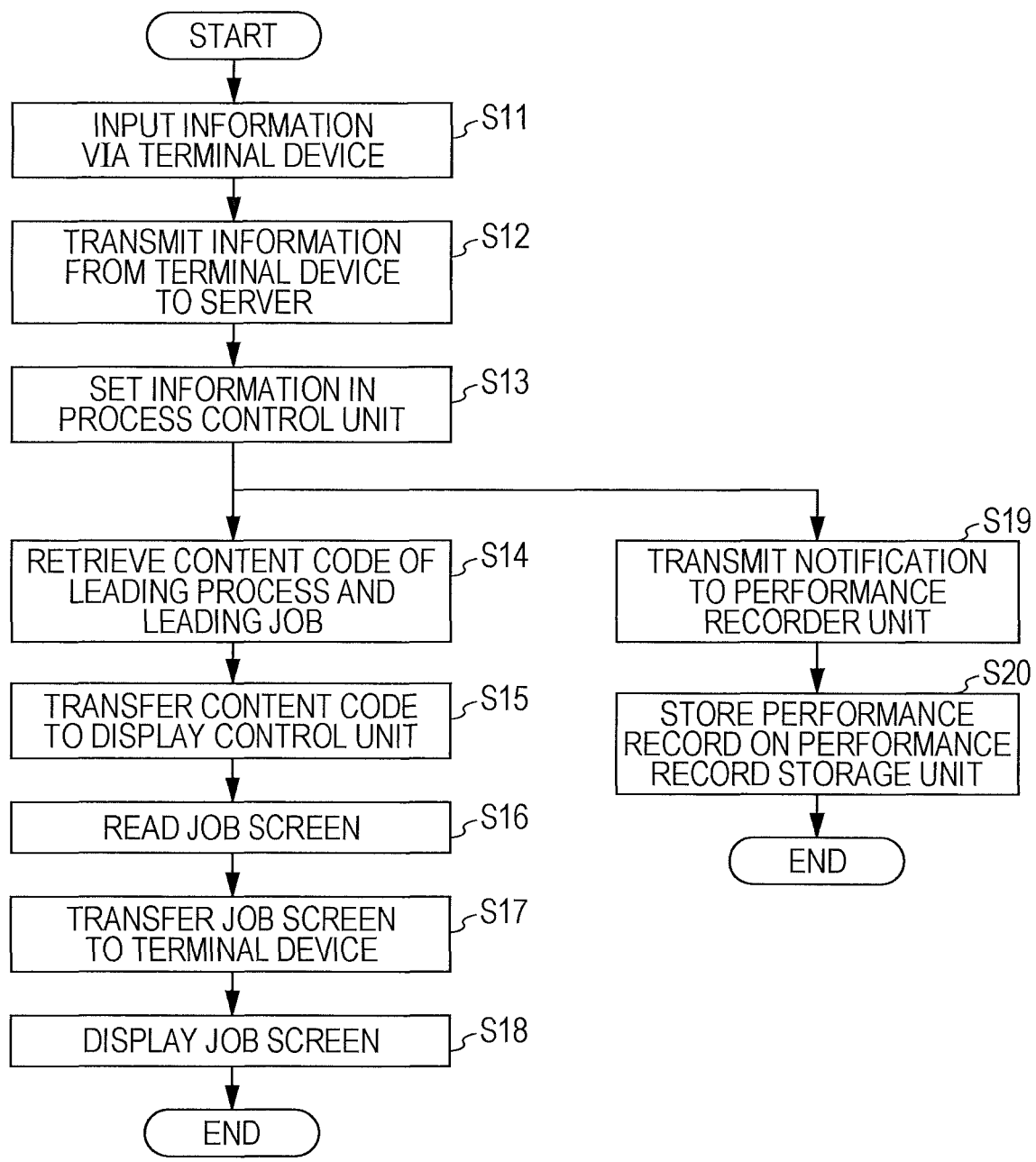
FIG. 14 is a flowchart illustrating an operation performed at the startup of an assembly job.

The operation of each element of the terminal device 10 and the server 20 and the operation performed by the operator from the start of the assembly job are described below. FIG. 14 is a flowchart illustrating an operation of each element at the startup of the assembly job.

When the assembly job is performed, information identifying a product as an assembly target, such as the "drawing number," or the "serial number" is inputted via the terminal device 10 (S11). The input information is transmitted together with information identifying the terminal device 10 to the server 20 (S12). Information such as the "drawing number" may be converted into a bar code, and the bar code may be attached to the assembly target product. At the start of the assembly, the bar code may be read using a bar code reader arranged on the terminal device 10. The information such as the "drawing number" of the assembly target product may be easily obtained.

The name of the operator performing the job is transmitted together with the information identifying the product to the server 20. A particular operator may use only a particular terminal device 10. If the server 20 has information associating the terminal device 10 with the operator, the terminal device 10 simply transfers to the server 20 only the information identifying the terminal device 10.

Upon receiving the notification from the terminal device 10 via the event monitor unit 212, the operation instructing unit 213 sets on the process control unit 220 the following information (S13). The information set on the process control unit 220 by the operation instructing unit 213 includes the apparatus information including the drawing number and the serial number, information identifying the terminal device 10, and operator information identifying the operator. The management unit 215 expands the process and the job corresponding to the specified apparatus information based on the information set on the process control unit 220, and starts managing the assembly job. The management unit 215 retrieves the content code corresponding to the address of a leading process and a leading job from the content code table (S14), and transfers to the retrieved content code to the display control unit 216 (S15).

The display control unit 216 searches the page data storage unit 221 in accordance with the transferred content code and reads from the page data storage unit 221 a job screen corresponding to the leading process and the leading job (S16). The display control unit 216 transfers the read job screen to the terminal device 10 via the transceiver 211. In this case, the transceiver 211 attaches, to the job screen, information identifying the terminal device 10 as the transfer destination of the job screen, and then transmits the job screen (S17).

Upon receiving the information of the job screen with the information identifying own device, the terminal device 10 displays the received job screen on the display unit 12 (S18).

In parallel with displaying the job screen, the operation instructing unit 213 notifies the performance record recorder unit 217 of the notification content from the terminal device 10 (S19). The performance record recorder unit 217 retrieves from the process control unit 220 the drawing number, the serial number, and the operator name supplied by the terminal device 10. The performance record recorder unit 217 stores these pieces of information together with the operation time and date of the terminal device 10 onto the performance record storage unit 222 (S20). The performance record recorder unit 217 further records the address of the leading process on the process address n, and the address of the leading job of the leading process on the job address m.

Through the above series of operations, the assembly job is ready to start.

Figure 15:
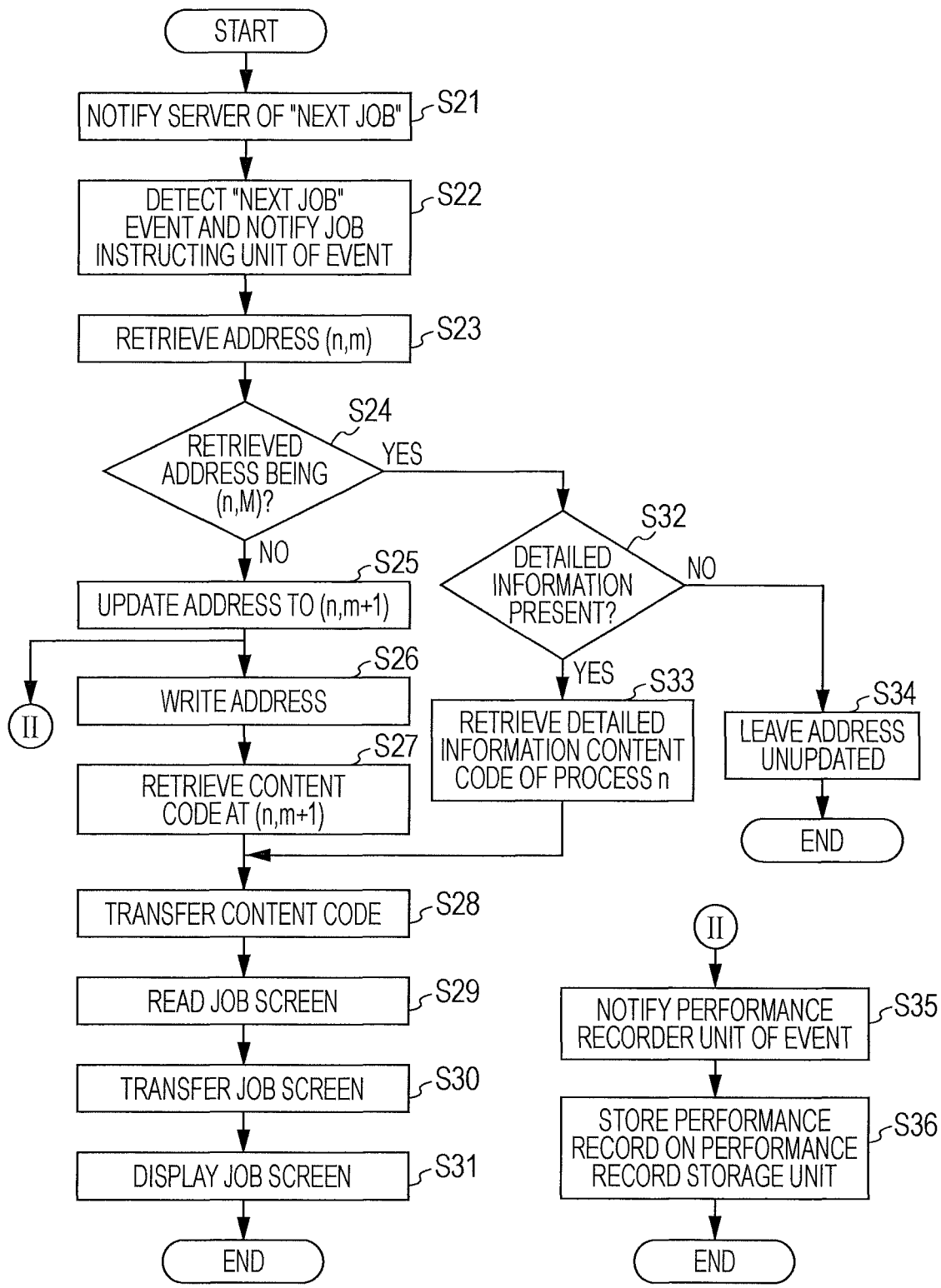
FIG. 15 is a flowchart illustrating an operation performed when a "next job" is selected.

An operation performed when the operator selects the "next job" is described below. FIG. 15 illustrates the operation of each element of the terminal device 10 and the server 20 performed when the operator selects the "next job."

When the operator selects a region of the touch panel 13 corresponding to the "next job," the terminal device 10 transmits to the server 20 the information identifying own device together with a notification that the "next job" has been selected (S21).

When the event monitor unit 212 detects the "next job" event (S22), the operation instructing unit 213 retrieves from the process job address recorder unit 214 the address (n,m) corresponding to the operator (S23), and determines whether the retrieved address (n,m) is an address (n,M) of the final job of the process n (S24). This determination operation is performed by referencing the information expanded on the management unit 215.

If the retrieved address (n,m) is not the address (n,M) of the final job of the process n (no branch from S24), the operation instructing unit 213 updates the address to (n,m+1) (S25), and transfers the updated address to the process job address recorder unit 214. The process job address recorder unit 214 writes the transferred address (S26). Through this operation, the address recorded on the process job address recorder unit 214 is updated to the address of the next job.

When the address of the process job address recorder unit 214 is updated, the management unit 215 retrieves from the content code table the content code corresponding to the updated address (n,m+1) (S27), and then transfers the content code to the display control unit 216 (S28). The display control unit 216 having received the content code from the management unit 215 reads out from the page data storage unit 221 the job screen corresponding to the received content code (S29), and then transmits the job screen to the terminal device 10 via the transceiver 211 (S30).

The terminal device 10 displays the job screen received from the server 20 onto the display unit 12 (S31).

In a control operation separate from displaying the job screen, the operation instructing unit 213 transfers to the performance record recorder unit 217 the detected "next job" event subsequent to the address updating in S25 (S35). Upon receiving the "next job," the performance record recorder unit 217 writes the "next job" in the operation signal column (S36). The performance record recorder unit 217 references the process job address recorder unit 214 and writes "n" at the process address and "m+1" at the job address on the performance record storage unit 222 in response to the updated address (n,m).

If the address retrieved from the process job address recorder unit 214 is (n,M) corresponding to the final job of the process n (yes branch from S24), the operation instructing unit 213 determines whether the detailed information is set to the process n (S32). If the detailed information is set (yes branch from S32), the operation instructing unit 213 instructs the management unit 215 to retrieve the detailed information of the process n. In response to the instruction from the operation instructing unit 213, the management unit 215 retrieves the content code corresponding to the detailed information screen of the process n, and notifies the display control unit 216 of the content code (S33). In the same way as the next job screen is displayed, the display control unit 216 reads the detailed information screen from the page data storage unit 221 (S29), and transmits the detailed information screen to the terminal device 10 via the transceiver 211 (S30). The detailed information screen is thus displayed on the display unit 12 in the terminal device 10 (S31).

If the operator selects any position of the touch panel 13 with the detailed information screen displayed, the terminal device 10 terminates the displaying of the detailed information screen and reverts back to the job screen of the final job of the process n. The terminal device 10 notifies the server 20 that the job screen has reverted back to the final job of the process n. In response to the notification from the terminal device 10, the server 20 recognizes that the display unit 12 in the terminal device 10 has reverted back to displaying the job screen corresponding to the final job of the process n.

If the detailed information is not set (no branch from S32), the operation instructing unit 213 does not update the address recorded on the process job address recorder unit 214 (S34). In other words, the job screen corresponding to the final job of the process n remains displayed on the terminal device 10 with no change taking place on the screen.

It is contemplated that the job screen of a next process (n+1) is displayed if a next job is selected while the final job M of the process n is in progress. However, if the "next job" is selected on the terminal device 10, it is difficult to discriminate whether the selection of the next job is the operator's intention or the operator's erratic operation.

If the "next job" is selected by the operator without being aware that the process n has been completed, the job screen of a next process n+1 is displayed as a result. The operator is likely to erratically perform a job in accordance with the job screen displayed on the display unit 12 not knowing that the job screen has been shifted to the next process n+1. In order not for the operator to erratically recognize the job screen and to make an error on the job screen, the job screen of the next process n+1 is preferably displayed only when the operator recognizes that the series of jobs of the process n has been completed.

The display apparatus of the embodiment is used to manage the progress of the job and to manage the process. If the screen of the next process is displayed with the "next job" selected, the performance record typically accounts for that history of operation. The operator may have operated the "next job" without being aware the completion of the series of jobs of one process. The performance record recorded becomes redundant and is not highly reliable information in a sense.

In view of the above situation, the job screen is not updated and is disabled to proceed to a next process in the embodiment even if the "next job" is selected with the final job screen of a given process displayed.

Figure 16:
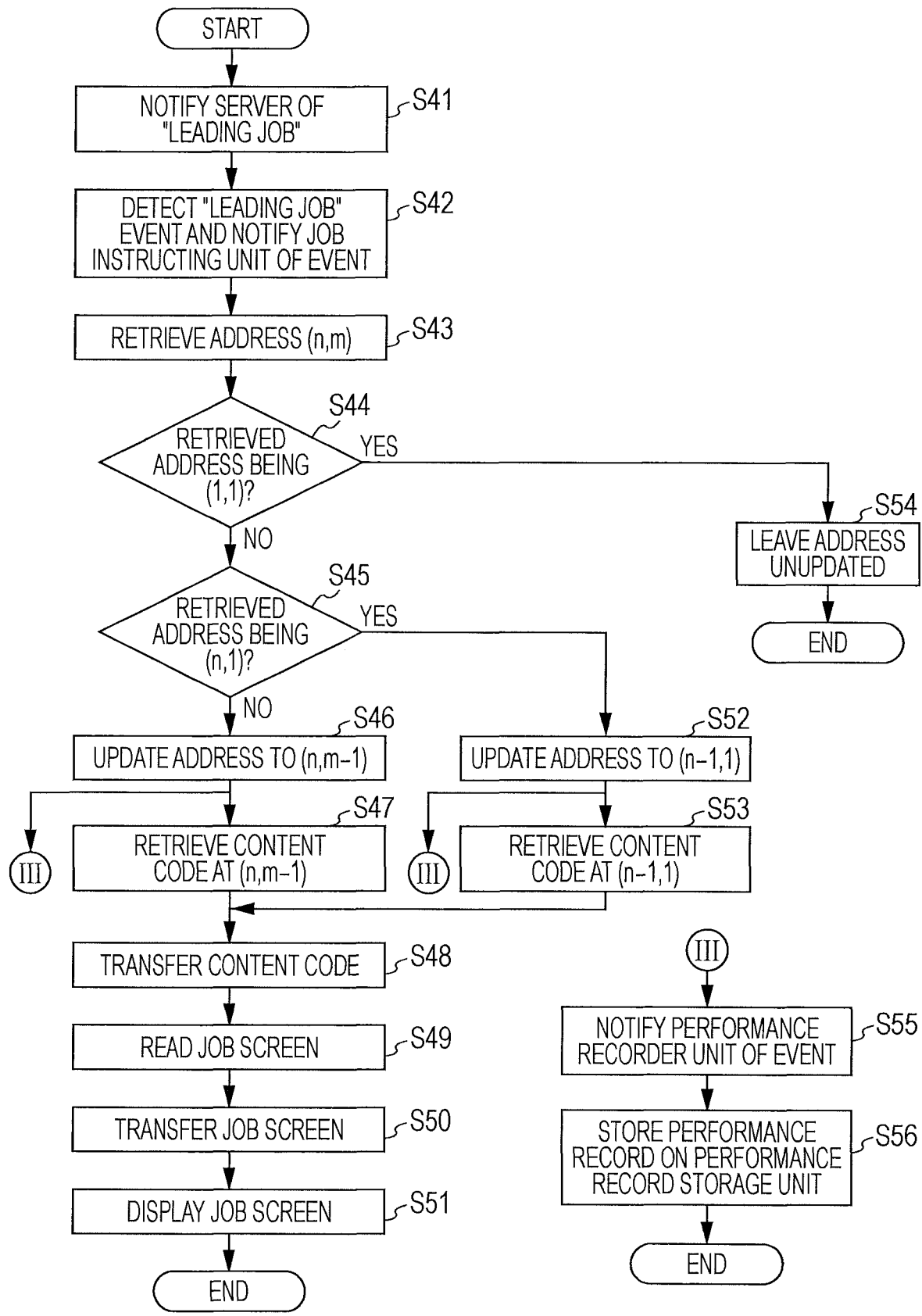
FIG. 16 is a flowchart illustrating an operation performed when a "preceding job" is selected.

An operation when the operator selects the "preceding job" on the terminal device 10 is described below. FIG. 16 is a flowchart illustrating an operation of each element of the terminal device 10 and the server 20 when the "preceding job" is selected.

When the operator selects the "preceding job" on the terminal device 10, the terminal device 10 notifies the server 20 of the selection of the "preceding job" and the identification information of own device (S41).

The event monitor unit 212 having detected the "preceding job" event notifies the operation instructing unit 213 of the detection of the "preceding job" event (S42). In response to the notification from the event monitor unit 212, the operation instructing unit 213 retrieves the address (n,m) recorded on the process job address recorder unit 214 (S43), and determines whether the retrieved address (n,m) matches an address (1,1) of the leading process and the leading job (S44).

If the retrieved address is (1,1) (yes branch from S44), the operator is unable to move the job screen backward further. The operation instructing unit 213 does not update the address retrieved from the process job address recorder unit 214 (S54). The server 20 does not issue an instruction to update the job screen to the terminal device 10. The job screen displayed on the terminal device 10 remains the job screen of the leading process and the leading job.

If the retrieved address is not (1,1) (no branch from S44), the operation instructing unit 213 determines whether the retrieved address is (n,1), i.e., the retrieved address matches the address of the leading job in the process n (S45).

If the retrieved address is not (n,1) (no branch from S45), the operation instructing unit 213 updates the address to (n,m−1), and writes the updated address on the process job address recorder unit 214 (S46).

The process job address recorder unit 214 is thus updated, and the management unit 215 retrieves the content code corresponding to the updated address (n,m−1) (S47), and notifies the display control unit 216 of the content code (S48). The display control unit 216 reads out from the page data storage unit 221 the job screen corresponding to the content code from the management unit 215 (S49), and transmits the read job screen to the terminal device 10 via the transceiver 211 (S50). The job screen of the preceding job of the same process is thus displayed on the terminal device 10 (S51).

If the retrieved address matches (n,1), i.e., the address of the leading job of the process n (yes branch from S45), the operation instructing unit 213 updates the address to (n−1,1), i.e., the address of the leading job of a preceding process (n−1), and writes the updated address on the process job address recorder unit 214 (S53). Operations following S48 are performed and the leading job screen of the preceding process (n−1) is displayed on the terminal device 10 (S51).

As is the case with the "next job," it is contemplated that the final job screen of the preceding process (n−1) is displayed on the terminal device 10 if the "preceding job" is selected with the leading job screen of the process n displayed. The operator may actually select the "preceding job." The final job screen of the preceding process may be displayed on the terminal device 10, although the operator does not intend to display the job screen of the preceding process, and may fail to understand which job screen is displayed. Each process is considered one unit of procedure. When the "preceding job" is selected with the leading job screen of the process n displayed, the operator more easily learns that the job screen has shifted to the screen of the preceding process if the leading job screen instead of the final job screen of the preceding process (n−1) is displayed.

In the embodiment, if a "preceding job" is selected with the leading job screen of a given process displayed, the job screen is shifted to the leading job screen of the preceding process based on the assumption that the operator intends to move back to the preceding process.

If a job (m#1) other than a leading job of a process is being executed, it is generally likely that the operator does not intend to move to the job screen of the preceding process. If the "preceding job" is selected with the job screen other than the leading job displayed, the job screen is controlled to shift to the job immediately preceding the present job in the same process.

If the "preceding job" is selected, the operation instructing unit 213 instructs the performance record recorder unit 217 to record the performance record in parallel with controlling the displaying of the job screen (S55). The instruction to record the performance record is issued subsequent to the updating of the address in S46 or S52. The performance record recorder unit 217 references the process job address recorder unit 214, and writes the address, if updated, at the "process address n" column and the "job address m" column, respectively (S56). The performance record recorder unit 217 references the process control unit 220 to retrieve the apparatus information and the operator information, and then writes the apparatus information and the operator information on the performance record storage unit 222.

Figure 17:
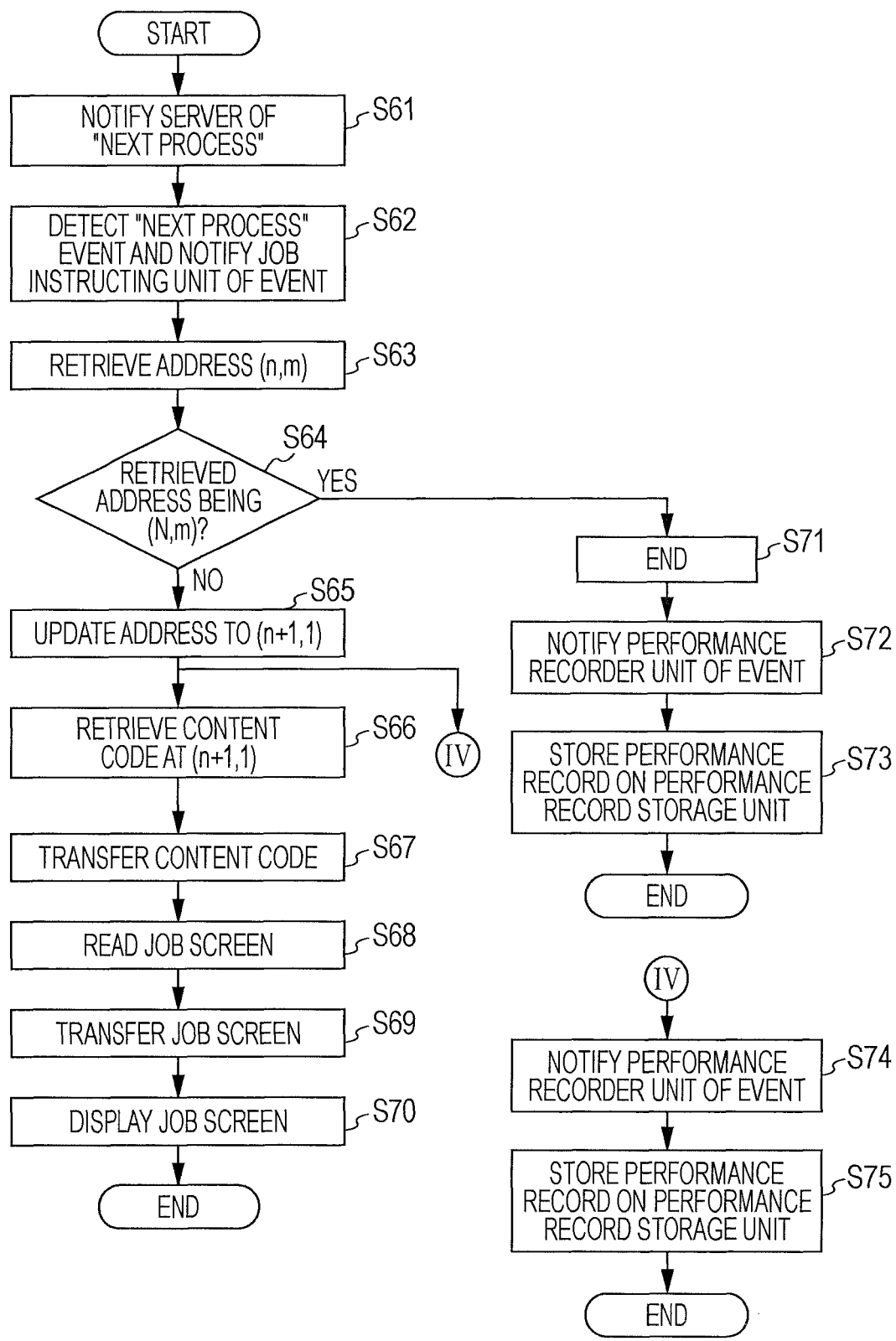
FIG. 17 is a flowchart illustrating an operation performed when a "next process" is selected.

An operation when the operator selects the "next process" on the terminal device 10 is described. FIG. 17 is a flowchart illustrating the operation performed when the "next process" is selected.

The operator selects the "next process" on the terminal device 10 of the embodiment in order to check the job screen of a next process subsequent to a process presently in progress. The operator also selects the "next process" in order to check that the jobs of one process have been completed.

When the region of the touch panel 13 corresponding to the "next process" is selected by the user, the terminal device 10 notifies the server 20 of the identification information of own device and the selection of the "next process" (S61).

The event monitor unit 212 detects the event of the "next process" from the notification from the terminal device 10, and notifies the operation instructing unit 213 of the event detection of the "next process" (S62). Upon receiving the notification from the event monitor unit 212, the operation instructing unit 213 retrieves the address (n,m) recorded on the process job address recorder unit 214 (S63). The operation instructing unit 213 then determines whether the retrieved address is (N,m), i.e., any of the addresses of the final process N (S64).

If the retrieved address is (N,m) (yes branch from S64), the operation instructing unit 213 determines that all the series of processes having the same drawing number have been completed, and ends the operation (S71). The operation instructing unit 213 notifies the performance record recorder unit 217 of the "next process" (S73). In response to the notification from the operation instructing unit 213, the performance record recorder unit 217 records the "next process" at the "operation signal" column of the performance record, and records at the "process address n," and the "job address m," information, indicating that the final process has been completed, rather than the address (S73).

The performance record recorder unit 217 writes on the performance record storage unit 222 the performance record to the effect that the series of processes has been completed.

If the retrieved address is not (N,m), i.e., the retrieved address is not any of the addresses of the final process (no branch from S64), the operation instructing unit 213 updates the retrieved address (n,m) to (n+1,1), and writes (n+1,1) on the process job address recorder unit 214 (S65).

The management unit 215 references the updated address on the process job address recorder unit 214, retrieves the content code corresponding to (n+1,1) (S66), and notifies the display control unit 216 of the content code (S67).

The display control unit 216 reads out from the page data storage unit 221 the job screen corresponding to the content code from the management unit 215 (S68), and transmits the job screen via the transceiver 211 to the terminal device 10 that has notified of the "next process" (S69).

The display unit 12 in the terminal device 10 displays the job screen corresponding to the leading job of the next process (n+1) (S70).

After updating the address in S65, the operation instructing unit 213 notifies the performance record recorder unit 217 of the "next process" (S74). In the performance record, the "next process" is written in the "operation signal" column, and the updated address is written in the "process address n" column and the "job address m" column (S75).

Figure 18:
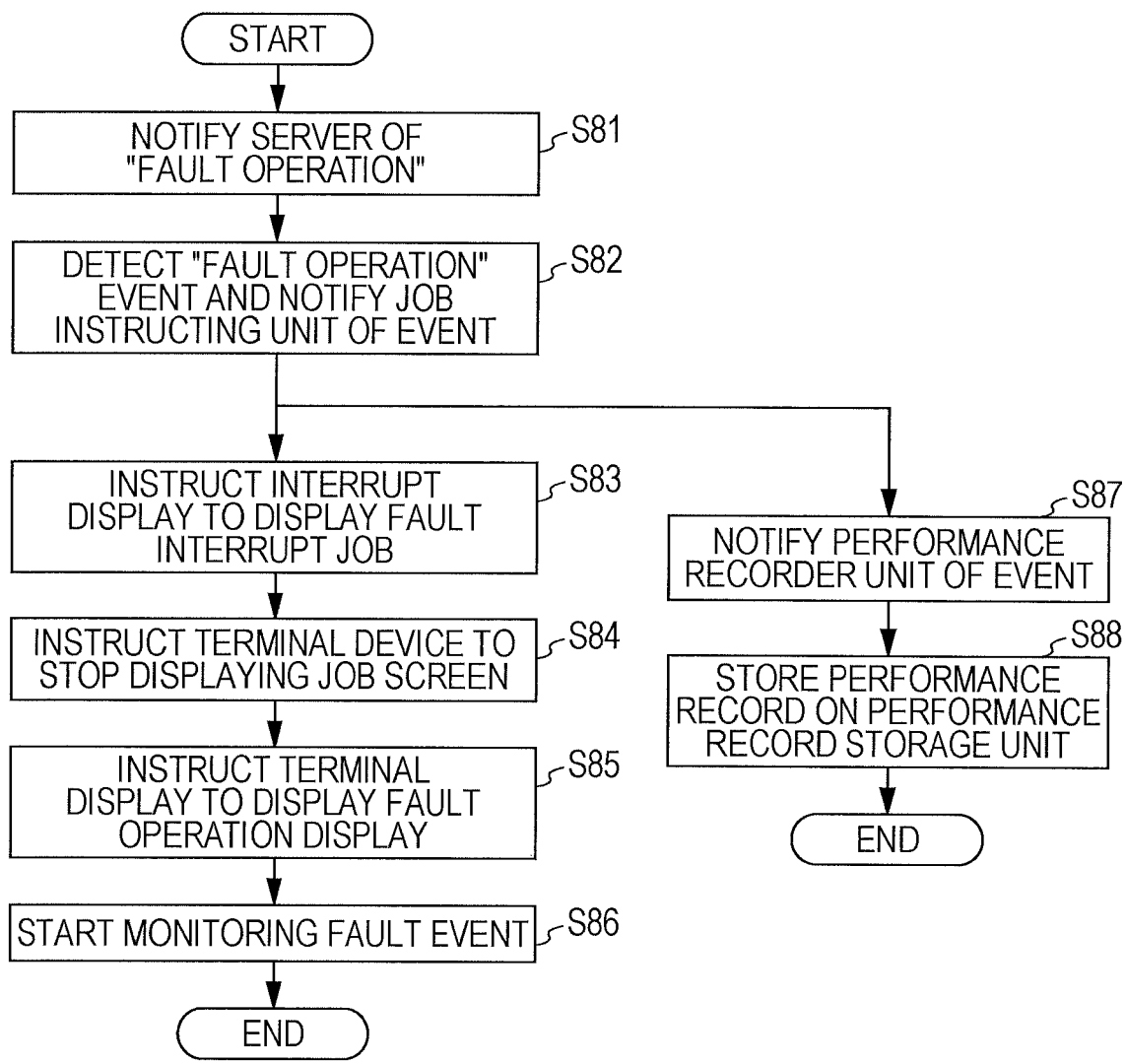
FIG. 18 is a flowchart illustrating an operation performed when a "fault operation" is selected.

An operation performed when the operator selects a "fault operation" on the terminal device 10 is described. FIG. 18 is a flowchart illustrating the operation when the "fault operation" is selected.

If a fault such as a damage in a product occurs in the assembly job, the operator selects a region of the terminal device 10 corresponding to the "fault operation." The terminal device 10 then notifies the server 20 that the "fault operation" has been selected. In this case, as well, the terminal device 10 notifies the server 20 of the identification information of own device (S81).

When the notification is received from the terminal device 10 via the transceiver 211, the event monitor unit 212 detects the "fault operation" event. The event monitor unit 212 notifies the operation instructing unit 213 that the "fault operation" event has been detected (S82).

The operation instructing unit 213 is notified of the detection of the "fault operation" event by the event monitor unit 212, and instructs the interrupt display unit 218 to execute a fault interrupt operation (S83). In response to the instruction from the operation instructing unit 213, the interrupt display unit 218 instructs the terminal device 10 via the transceiver 211 to suspend the displaying of the job screen (S84). The interrupt display unit 218 also instructs the terminal device 10 to display a fault operation screen (S85). Through this operation, the terminal device 10 displays the fault operation screen.

The operation instructing unit 213 receives the notification of the "fault operation" event from the event monitor unit 212, and instructs the performance record recorder unit 217 to record the performance record of the fault operation (S87). In response to the instruction from the operation instructing unit 213, the performance record recorder unit 217 records the "fault operation" in the "operation signal" column of the performance record (S88). The address at the time of the detection of the "fault operation" may be recorded in the "process address" column and the "job address" column.

When the interrupt display unit 218 transmits the notification to the terminal device 10, the fault event monitor unit 219 starts monitoring a fault event from the terminal device 10 (S86).

Figure 19:
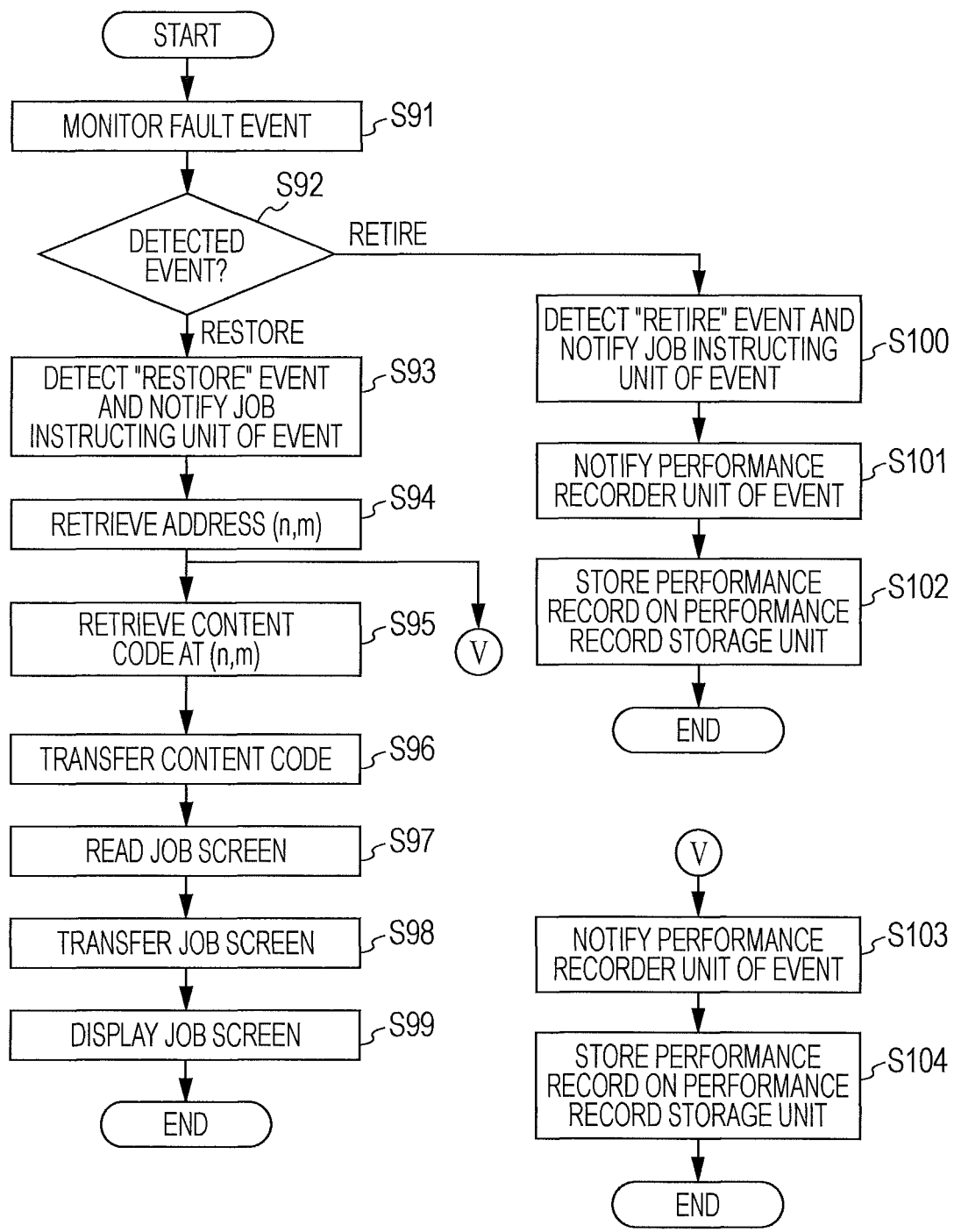
FIG. 19 is a flowchart illustrating an operation performed when a fault event is monitored.

Described below is an operation performed in a period throughout which the fault event monitor unit 219 performs the event monitoring. FIG. 19 illustrates the operation during the event monitoring period of the fault event monitor unit 219.

If a fault has been cleared with the fault operation screen displayed, the operator selects the "restore" region on the fault operation screen. This operation also serves to the server 20 as a notification that a product as a target of the assembly job at the occurrence of the fault is introduced back into the assembly line of the product.

The fault event monitor unit 219 performing the fault event monitoring may detect the "restore" event in the notification from the terminal device 10 (S91 and "restore" branch from S92). The fault event monitor unit 219 then notifies the operation instructing unit 213 of the detection of the "restore" event (S93). Since the address at the generation of the "fault operation" event is stored on the process job address recorder unit 214, the management unit 215 references that address (S94). The management unit 215 retrieves from the content code table, the content code corresponding to the referenced address (S95). The management unit 215 then notifies the display control unit 216 of the content code (S96).

The display control unit 216 reads out from the page data storage unit 221 the job screen corresponding to the content code from the management unit 215 (S97). The display control unit 216 attaches to the job screen the identification information of the terminal device 10, which has notified of the "restore," and then transmits the job screen to the terminal device 10 via the transceiver 211 (S98). Upon receiving the notification with the identification information attached thereto, the terminal device 10 displays the received job screen on the display unit 12 thereof (S99). The job screen is then displayed on the terminal device 10 of the operator. The operator then continues the assembly job.

The operation instructing unit 213 receives the notification from the fault event monitor unit 219, retrieves the address (n,m) in S94, and instructs the performance record recorder unit 217 to record a performance record that the fault has been cleared (S103). Upon receiving the instruction from the operation instructing unit 213, the performance record recorder unit 217 records the "restore" in the "operation signal" column. The performance record recorder unit 217 retrieves the address corresponding to the restored job screen from the management unit 215 and then records the address in the "process address n" column and the "job address m" column, respectively (S104).

If the fault is difficult to be cleared, the assembly target product is removed from the assembly line, and the operator selects the "retire" region displayed on the fault operation screen of the terminal device 10. In this case, the terminal device 10 notifies the server 20 that the "retire" operation has been selected (S91, "retire" branch from S92, and S100).

Upon detecting the "retire" event included in the notification from the terminal device 10, the fault event monitor unit 219 notifies the operation instructing unit 213 of the "retire" event (S101). The fault event monitor unit 219 then terminates the operation after determining that the series of assembly jobs has been suspended (S102).

Upon receiving the notification from the fault event monitor unit 219, the operation instructing unit 213 instructs the performance record recorder unit 217 to record a performance record that the "retire" operation has been selected (S103). The performance record recorder unit 217 thus writes the "retire" in the "operation signal" column of the performance record (S104).

A record of process management is typically stored. To this end, the operator is requested to select the "restore" operation or the "retire" operation in the embodiment such that an action taken subsequent to the occurrence of the "fault operation" is checked.

In the embodiment, the management unit 215 manages the address of each job and the content code by mapping the address to the content code. The display control unit 216 reads out the job screen from the page data storage unit 221 in accordance with the content code. The job screen is not directly mapped to the address of the job. The reviewing of the process job may result in the shifting or omitting an original process (n,m). The reviewing of the content of the process job may result in the modification of the job procedure, or the addition of a new process (n',m'). In such a case, a job screen matching the process job of interest is easily displayed in a manner free from the process job. Even if the process job is to be reviewed, the content code mapped to each process is simply modified, and the modification of the page data storage unit 221 functioning as an image database is limited to a minimum.

FIGS. 20 through 24 illustrate operations when the process job is modified. FIGS. 20 through 24 illustrate how the content code managed by a content code table 231 is processed when a particular signal is selected. The operations illustrated in FIGS. 20 through 24 are performed by the management unit 215 in the server 20 having received a signal from the operator.

The assembly process jobs of the same product are not necessarily the same. A variety of improvement activities are typically in progress at the work place. The optimization of the process and the optimization of the job may frequently cause a modification in the process order and a modification in the job order. In the embodiment, the responses to the variety of improvement activities are implemented by modifying the content of the content code managed by the management unit 215.

The operations discussed below may be performed by executing a program on the server 20.

Figure 20:
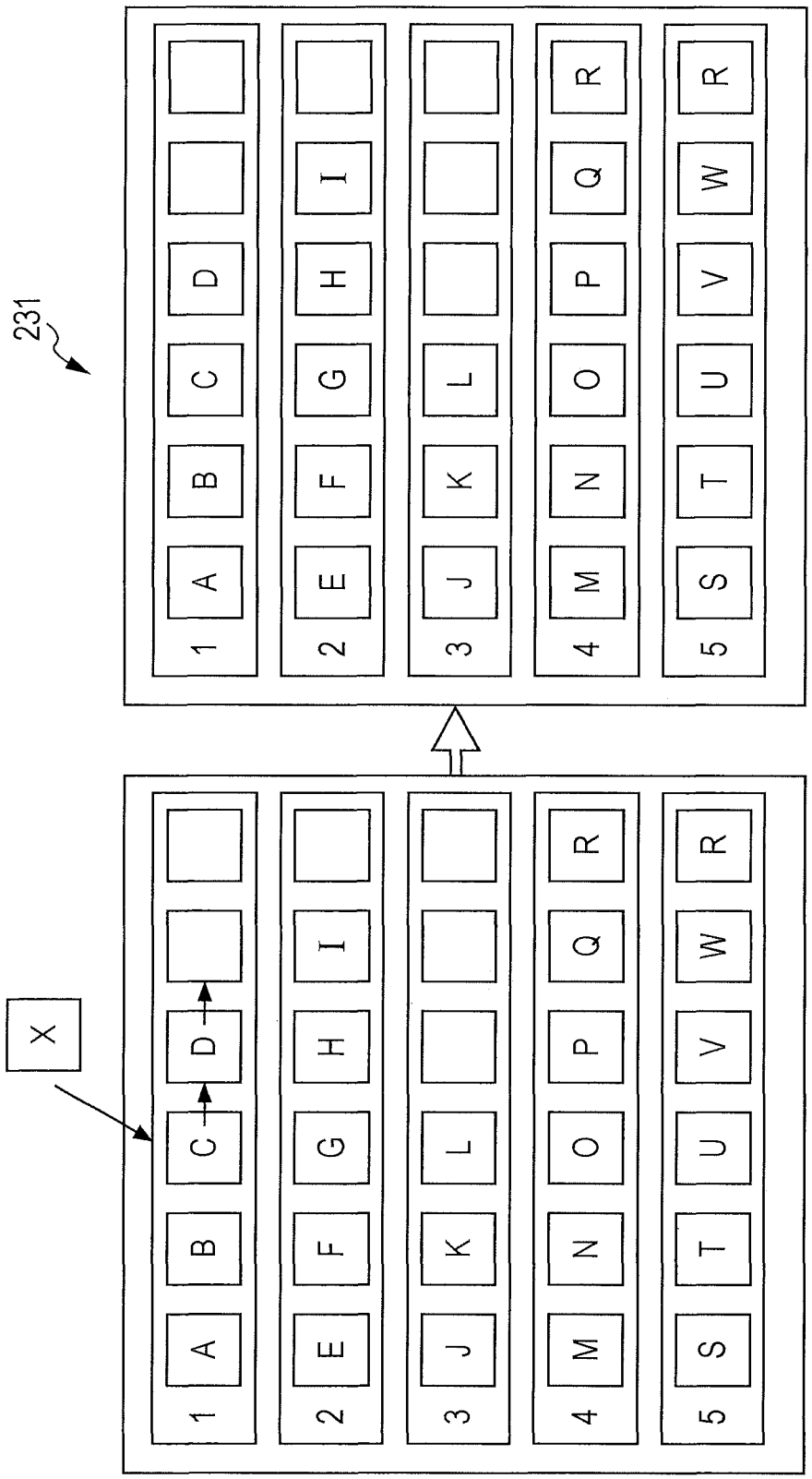
FIG. 20 illustrates an operation performed on content data in a content data table when a job is added.

The addition of a series of jobs is described below with reference to FIG. 20. FIG. 20 illustrates the content code table 231. Content data before updating is illustrated in the left portion of FIG. 20, and content data after updating is illustrated in the right portion of FIG. 20. The same is true of FIGS. 21 through 24.

In the example here, the content data of a job X, i.e., the job screen is added to a job address (1,3) of a process 1.

If the job screen of the job X remains unregistered, the job screen of the job X is mapped to the content code X and then stored on the page data storage unit 221. The job screen of the job X is supplied in the form of image information to the server 20 using a variety of input devices. The operator may input the content code X corresponding to the job screen of the job X using the input device. If the job screen of the job X is already registered on the page data storage unit 221, the storage operation of the job screen is not performed.

The management unit 215 updates the content code table 231 such that the content code "X" is mapped to the job address (1,3). In this case, the management unit 215 remaps the content codes "C" and "D," respectively originally mapped to the addresses (1,3) and (1,4), in one address shifted positions, i.e., to addresses (1,4) and (1,5), respectively, in order to update the content code table 231.

This operation allows the job screen of the added job to be easily mapped to the process even if the new job is added to the given process.

Figure 21:
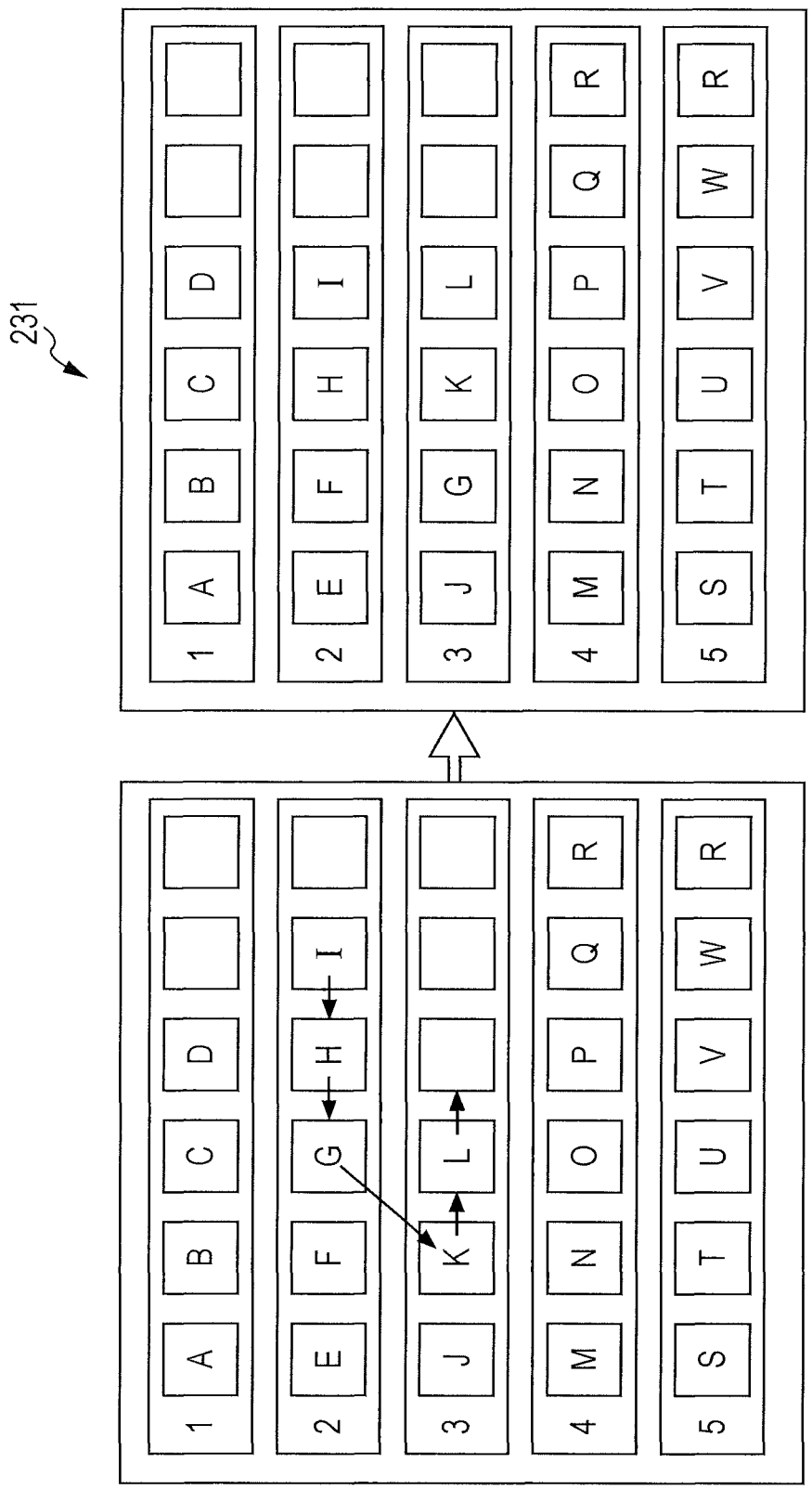
FIG. 21 illustrates an operation performed on the content data in the content data table when the job procedure is modified between processes.

A change in the job order between processes is described with reference to FIG. 21.

An operation of shifting a third job (2,3) in a process 2 to an address (3,2) in a process 3 is described below.

The management unit 215 shifts content codes "K" and "L," mapped to the addresses (3,2) and (3,3) in the content code table 231, by one address to addresses (3,3) and (3,4), respectively. The management unit 215 then shifts a content code "G", originally mapped to an address (2,3), to the address (3,2) in the content code table 231.

The address (2,3) becomes empty in the process 2. The management unit 215 shifts content codes "H" and "I," mapped to addresses (2,4) and (2,5), to addresses (2,3) and (2,4), respectively.

Figure 22:
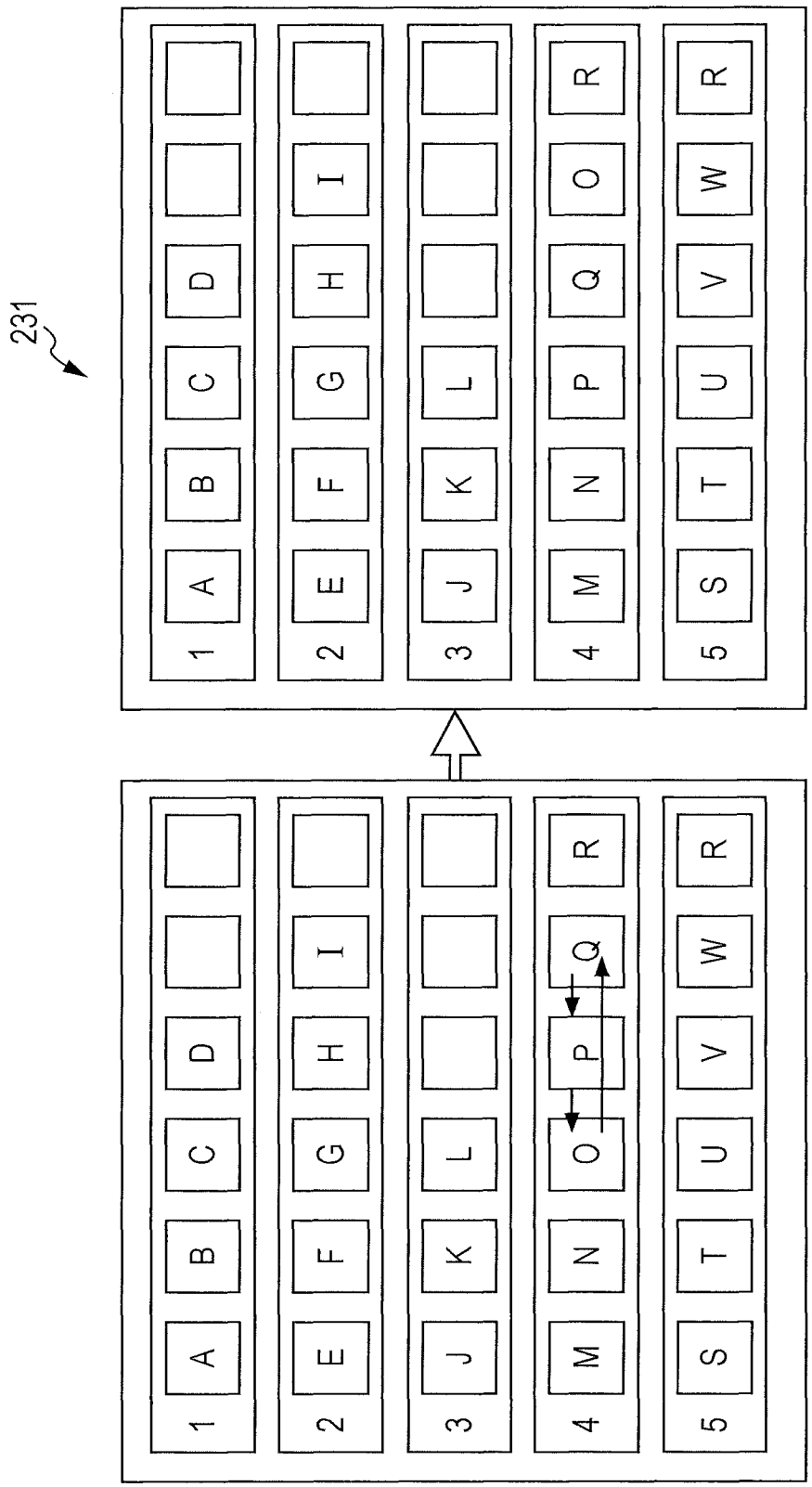
FIG. 22 illustrates an operation performed on the content data in the content data table when the job order is modified within one process.

A modification in the job order in a process is described with reference to FIG. 22.

The order of jobs "O," "P," and "Q" in a process 4 is described here.

The content code "O" is mapped to address (4,3) in the process 4. Similarly, the content code "P" is mapped to address (4,4), and the content code "Q" is mapped to address (4,5). The job order is changed from "O"→"P"→"Q" to "P"→"Q"→"O".

The management unit 215 modifies the mapping of the jobs "O," "P," and "Q" to addresses. The management unit 215 updates the content code table 231 such that the content code "P" is mapped to address (4,3), the content code "Q" is mapped to address (4,4), and the content code "0" is mapped to address (4,5). The job order is changed within the process 4. The mapping between the job screen of each job and the content code remains unchanged. Even if the job order is changed within the process, the job screen may be retrieved in accordance with the content code mapped to the job address as the shift destination.

Figure 23:
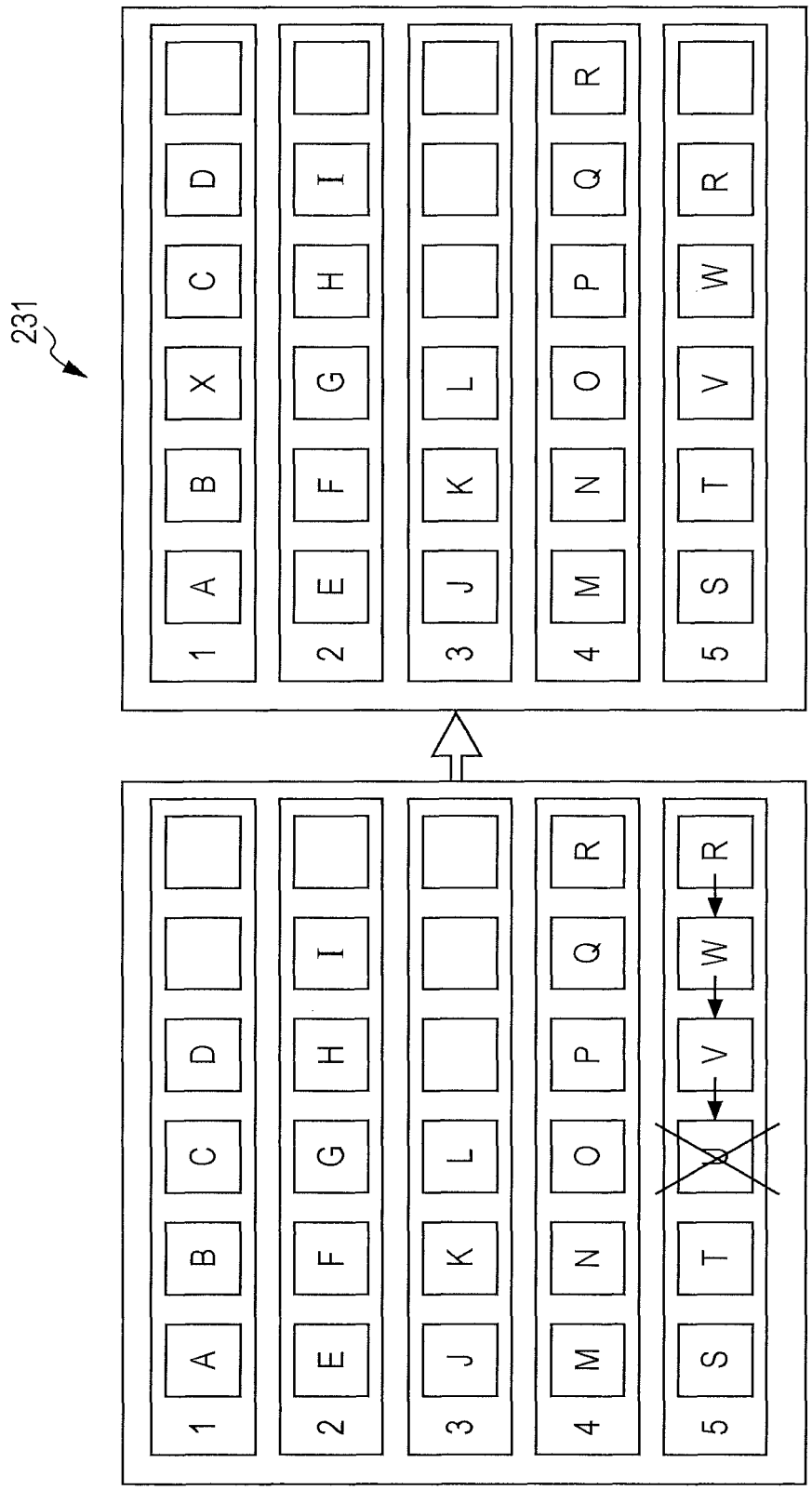
FIG. 23 illustrates an operation performed on the content data in the content data table when a job is deleted.

A deletion of a job from a process is described below with reference to FIG. 23.

A job "U" is deleted from a process 5 here in this example.

The management unit 215 references the content code table 231, and cancels the mapping between address (5,3) and the content code "U." In order to advance the jobs "V," "W," and "R" in the job order following the job "U" as a delete target, the management unit 215 modifies addresses respectively mapped to the content codes "V," "W," and "R" to (5,3), (5,4), and (5.5).

Figure 24:
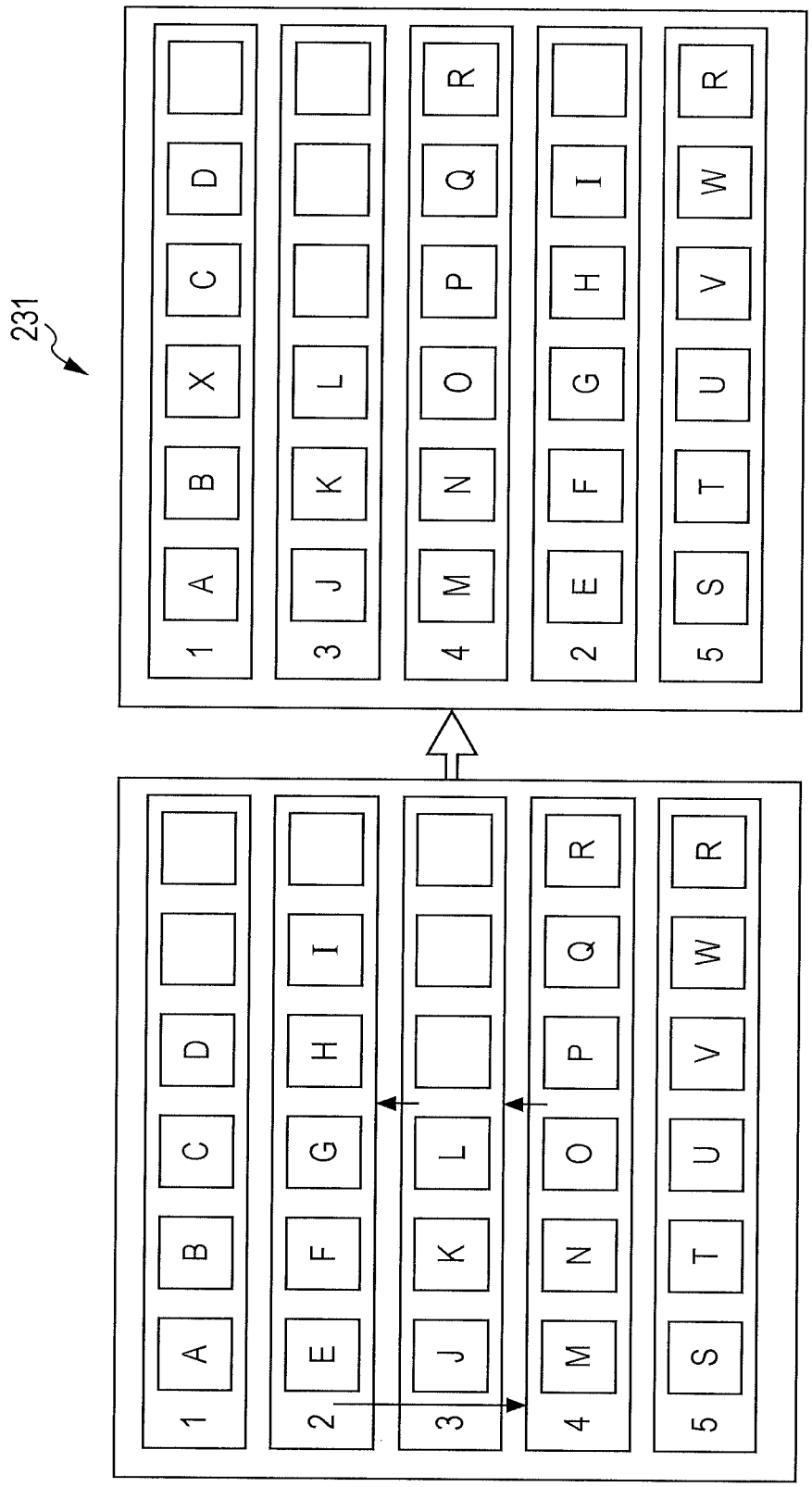
FIG. 24 illustrates an operation performed on the content data in the content data table when a process is shifted and substituted.

An operation of changing the process order is described below. FIG. 24 illustrates an operation procedure of changing the process order.

In this operation example, a process 2 is moved behind a process 4.

The management unit 215 shifts, at a time, the content codes corresponding to the jobs within the process 2 to the position of the process 4 (the process address being "4") in the content code table 231. Along with this operation, the management unit 215 advances processes 3 and 4 in order. The content codes of the process 3 are shifted to the position of the process 2 and the content codes of the process 4 are shifted to the position of the process 3.

The process numbers "1," "3," "4," "2," . . . are arranged from the top on the right side of each of the right and left portions of FIG. 24. The process numbers are for convenience only to indicate the difference between the right and left portions of FIG. 24.

The addresses of the processes and the jobs managed by the management unit 215 remain unchanged in the operations from FIG. 20 through FIG. 24. The modification, the addition, and the deletion operations of the job screen responsive to the modification of the process and job are easily performed by simply modifying the mapping to the content codes.

Figure 25:
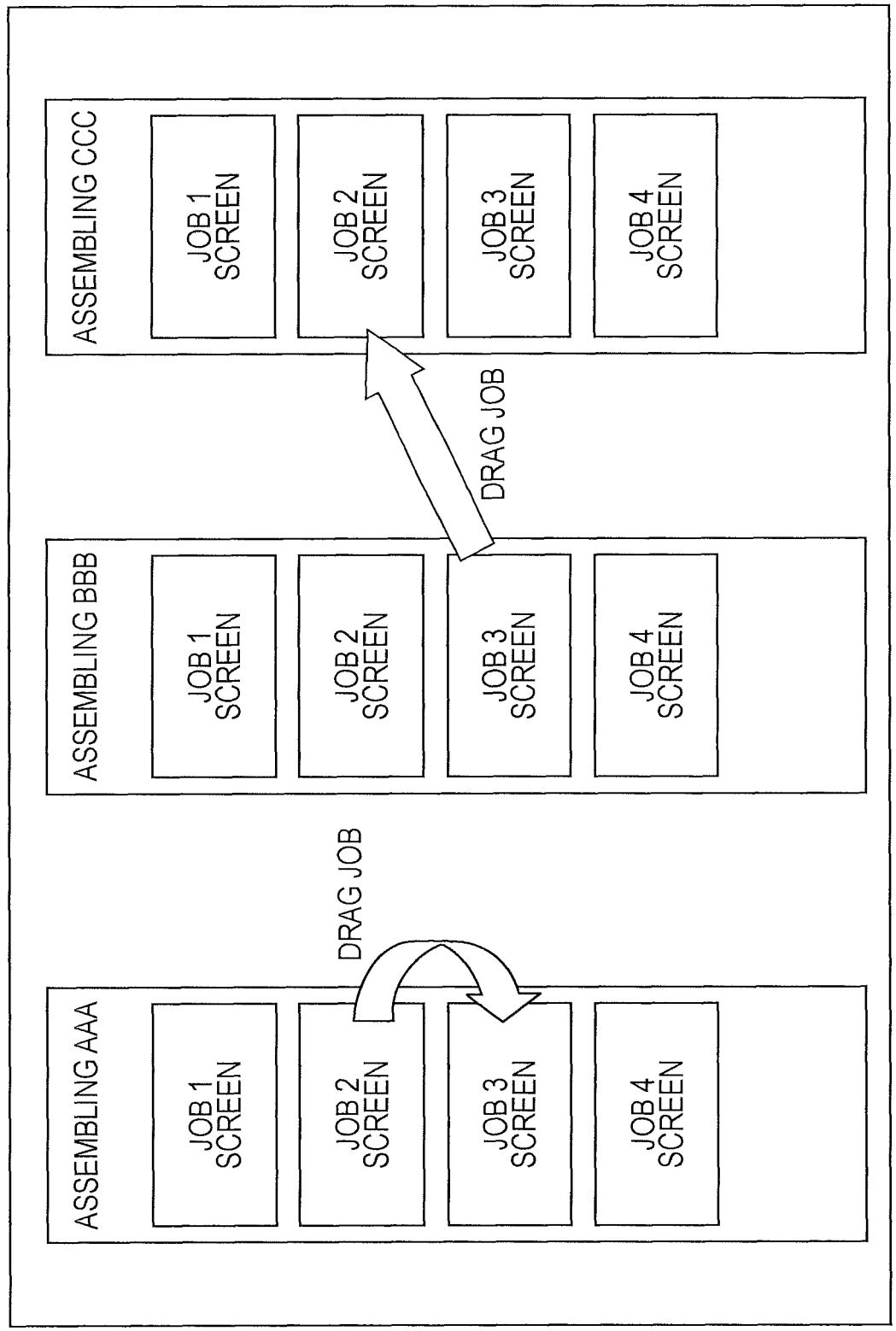
FIG. 25 illustrates a mouse operation performed when the job is modified.

The shifting and modification of the content code described above may be performed by a mouse-dragging operation on the screen as illustrated in FIG. 25.

One job may be modified in order with a series of job screens of a process displayed in a table. In such a case, the operator places a mouse on a job screen that the operator may wish to move in position, and drags the job screen to a destination in the dragging operation.

FIG. 25 illustrates a dragging operation in which the job screen of a job 2 of an "AAA assembly" process is shifted to a position of a job 3. In this case, the operator places the mouse on the position of the job screen of the job 2 and shifts the mouse to the position of the job screen of the job 3 in the dragging operation.

The management unit 215 in the server 20 recognizes the mapping between the coordinates of each job screen displayed on the display unit 12 and the content code of the job screen. When the dragging operation is performed as illustrated in FIG. 25, the management unit 215 determines from operation coordinates of the mouse which job screen is dragged. The management unit 215 verifies the coordinates of the mouse destination, and then recognizes the job screen at the mouse destination, and the content code. The management unit 215 maps the content code of the shift target screen to the address at the shift destination based on the recognition results. The management unit 215 maps the content code of a job to be advanced in order or a job to be receded in order in response to the shifting of the job to an address of an advance destination or a receding destination. As illustrated in FIG. 25, the management unit 215 maps the content code of the job screen of the job 2 to the address corresponding to the job 3. Since the job 3 advances in order, the management unit 215 updates the content code table such that the content code of the job screen of the job 3 is mapped to the address corresponding to the original job 2.

FIG. 25 also diagrammatically illustrates the operation of the operator in which the job screen of a job 3 in a BBB assembly process is shifted to the position of the job screen of a job 2 in a CCC assembly process. The operator moves the mouse to the position where the job screen of the job 3 in the BBB assembly process is displayed, and then moves the mouse in the dragging operation to the position where the job screen of the job 2 in the CCC assembly process is displayed.

The management unit 215 recognizes the mouse operation, and determines that the job screen of the job 3 in the BBB assembly process has been selected, and that the shift destination of the job screen is the job screen position of the job 2 in the CCC assembly process. The management unit 215 also retrieves the content code corresponding to the address of the job 3 in the BBB assembly process, and updates the content code table such that the content code is mapped to the address of the job 2 in the CCC assembly process. The job 4 and subsequent jobs in the BBB assembly process advance in order. The management unit 215 updates the content code table such that the content code of the job screen of the job 4 is mapped to the address corresponding to the empty job 3. On the other hand, the job 2 and subsequent jobs in the CCC assembly process recede in order. The management unit 215 updates the content code table such that the content code of the job 2 corresponding to the shift destination of the job 3 in the BBB assembly process is mapped to the address of the shift destination.

In order to change the process order, the operator moves a target process to be changed to a shift destination in the dragging operation.

The display apparatus described above is free from the need to lay paper documents such as drawings, procedure manuals, or check sheets on a desk, and thus increases job efficiency. In the embodiment, an operation event on the touch panel by the operator is recorded as a performance record of the operator. No paper check sheets are used, and the operator is free from checking the check sheet.

In the embodiment, the operator may select a desired region more accurately when the touch panel 13 is touched by a finger of the operator. No button is displayed on the display unit 12. The job screen is easy to view even if the display unit 12 is not large enough.

Since the jobs are grouped on a per process basis in the embodiment, the management of the jobs and the management of the processes are easy. In particular, each process and each job are managed by address and/or coordinates, and the mapping between the job screen and address and/or coordinates is managed by content code. The reading of the job screen is easy. An operation for modifying the job screen in response to a modification of the job and the process is easily performed.

The manner of shifting of the job screen is changed by referencing the addresses of the job and process at the time of the touch panel operation, and by taking into consideration the position of the address and the operation content of the operator. The shifting of the job screen is controlled in a manner appropriate to the job status.

If the operator erratically touches the touch panel 13, there is a possibility that the job screen shifts to a state that the operator may not intend. The shifting of the job screen is controlled taking into consideration whether the operator is in the leading job or the final job at the touch panel operation. Even if the operator erratically operates the touch panel 13, the effect of the erratic operation is minimized. In the embodiment, the job screen shifting instruction input by the user is used as the process management record to check the status of the process or the completion of the process. An erratic operation by the operator may lead to a problem in the record of the process management. In the embodiment, control is performed taking into consideration the progress status of the job and the operation content of the touch panel. The problem in the record of the process management is less likely.

In the embodiment, the terminal device having wireless communication function is used. Alternatively, however, a terminal device having wired communication function may be used.

In the embodiment, the information such as the job screen is stored on the server. The information such as the job screen may be stored on the terminal device. In such a case, the terminal device may store the information on a storage unit thereof, or a portable storage unit installed thereon. In response to an instruction from the server, the terminal device reads out the information from the storage unit and displays the information on the display unit thereof.

In the embodiment, the server recognizes the shifting of the job screen and the job. Alternatively, the terminal device may recognize the status of the job, and display the job screen in an autonomous fashion. If the performance record is all managed by the terminal device, the server of the type described above may not be used. If all the job progress status is to be monitored on a real-time basis, the display operation of the job screen may be performed on the terminal device in an autonomous fashion. The terminal device notifies the server of the touch panel operation. The server may record and manage the operation content from the terminal device as the performance record.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A display apparatus comprising:
   a display configured to display any of a plurality of job screens, each of the plurality of job screens corresponding to any of one or more job procedures, the one or more job procedure being associated with an assembly of an apparatus;
   a touch panel disposed on the display, the touch panel being configured to detect an operation by a user;
   a processor coupled directly or indirectly to the touch panel, the processor being configured to
      receive a position of an operation by the user from the touch panel, the position corresponding to any coordinates on the touch panel,
      identify a first region on the touch panel in accordance with the received position, the first region being any of a plurality of divided regions on whole area of the touch panel, the plurality of divided regions being transparently overlapped over a first job screen displayed on the display in a way that each of the plurality of divided regions is defined by a static boundary extended over whole of the display, the first job screen indicating a first job procedure, the first job procedure being any of the one or more of job procedures, the plurality of divided regions including at least a first divided region and a second divided region, the first divided region corresponding to a first command for going to a job screen corresponding to a preceding job procedure, the second divided region corresponding to a second command for going to a job screen corresponding to a second job procedure, the preceding job procedure being a job procedure one before the first job procedure, the second job procedure being different from the preceding job procedure and the first job procedure, and
      display, in response to the identifying the first region, a new job screen on the display in a way that each of the plurality of divided regions is transparently overlapped over the new job screen, wherein each of the plurality of divided regions is defined by a static boundary extended over whole of the new job screen.

2. The display apparatus according to claim 1,
   wherein the second job procedure is a next job procedure that is a job procedure one after the first job procedure.

3. The display apparatus according to claim 1,
   wherein each of the one or more job procedures belongs to any of a plurality of job groups,
   wherein each of the plurality of job groups is arranged in sequential order,
   wherein the second job procedure is a job procedure in a next job group that is a job group one after a first job group in the plurality of job groups,
   wherein the first job group is a job group to which the first job procedure belongs.

4. The display apparatus according to claim 1, further comprising:
   a wireless communication circuit;
   wherein the processor is configured to
      transmit a first signal to a server via the wireless communication circuit, the first signal corresponding to the identified first region.

5. The display apparatus according to claim 4,
   wherein the processor is configured to
      receive, in response to the transmitting of the first signal, the new job screen from the server,
      display the new job screen on the display in a way that each of the plurality of divided regions is transparently overlapped over the new job screen, wherein each of the plurality of divided regions is defined by a static boundary extended over whole of the new job screen.

6. The display apparatus according to claim 1,
   wherein an order of each of the plurality of job screens is changeable in accordance with a command issued from a computer different from the display apparatus.

7. A method of controlling to display a job screen indicating a job procedure, the method comprising:
   receiving, by a processor of a first computer, a position of an operation by the user from a touch panel, the position corresponding to any coordinates on the touch panel disposed on a display, the display being configured to display any of a plurality of job screens, each of the plurality of job screens corresponding to any of one or more job procedures, the one or more job procedure being associated with an assembly of an apparatus;
   identifying, by the processor of the first computer, a first region on the touch panel in accordance with the received position, the first region being any of a plurality of divided regions on whole area of the touch panel, the plurality of divided regions being transparently overlapped over a first job screen displayed on the display in a way that each of the plurality of divided regions is defined by a static boundary extended over whole of the display, the first job screen indicating a first job procedure, the first job procedure being any of the one or more of job procedures, the plurality of divided regions including at least a first divided region and a second divided region, the first divided region corresponding to a first command for going to a job screen corresponding to a preceding job procedure, the second divided region corresponding to a second command for going to a job screen corresponding to a second job procedure, the preceding job procedure being a job procedure one before the first job procedure, the second job procedure being different from the preceding job procedure and the first job procedure; and displaying, by the processor of the first computer, in response to the identifying the first region, a new job screen on the display in a way that each of the plurality of divided regions is transparently overlapped over the new job screen, wherein each of the plurality of divided regions is defined by a static boundary extended over whole of the new job screen.

8. The method according to claim 7, wherein the second job procedure is a next job procedure that is a job procedure one after the first job procedure.

9. The method according to claim 7,
wherein each of the one or more job procedures belongs to any of a plurality of job groups,
wherein each of the plurality of job groups is arranged in sequential order,
wherein the second job procedure is a job procedure in a next job group that is a job group one after a first job group in the plurality of job groups,
wherein the first job group is a job group to which the first job procedure belongs.

10. The method according to claim 7, further comprising:
transmitting a first signal to a server, the first signal corresponding to the identified first region.

11. The method according to claim 10, further comprising:
receiving, in response to the transmitting of the first signal, the new job screen from the server,
displaying the new job screen on the display in a way that each of the plurality of divided regions is transparently overlapped over the new job screen, wherein each of the plurality of divided regions is defined by a static boundary extended over whole of the new job screen.

12. The method according to claim 7,
wherein an order of each of the plurality of job screens and the one or more job procedures are changeable in accordance with a command issued from a second computer different from the first computer.

13. A non-transitory computer-readable storage medium for storing a program which causes a processor to perform processing of controlling to display a job screen indicating a job procedure, the processing comprising:
receiving a position of an operation by the user from a touch panel, the position corresponding to any coordinates on the touch panel disposed on a display, the display being configured to display any of a plurality of job screens, each of the plurality of job screens corresponding to any of one or more job procedures, the one or more job procedure being associated with an assembly of an apparatus;
identifying a first region on the touch panel in accordance with the received position, the first region being any of a plurality of divided regions on whole area of the touch panel, the plurality of divided regions being transparently overlapped over a first job screen displayed on the display in a way that each of the plurality of divided regions is defined by a static boundary extended over whole of the display, the first job screen indicating a first job procedure, the first job procedure being any of the one or more of job procedures, the plurality of divided regions including at least a first divided region and a second divided region, the first divided region corresponding to a first command for going to a job screen corresponding to a preceding job procedure, the second divided region corresponding to a second command for going to a job screen corresponding to a second job procedure, the preceding job procedure being a job procedure one before the first job procedure, the second job procedure being different from the preceding job procedure and the first job procedure; and
displaying, in response to the identifying the first region, a new job screen on the display in a way that each of the plurality of divided regions is transparently overlapped over the new job screen, wherein each of the plurality of divided regions is defined by a static boundary extended over whole of the new job screen.

14. The non-transitory computer-readable storage medium according to claim 13, wherein the second job procedure is a next job procedure that is a job procedure one after the first job procedure.

15. The non-transitory computer-readable storage medium according to claim 13,
wherein each of the one or more job procedures belongs to any of a plurality of job groups,
wherein each of the plurality of job groups is arranged in sequential order,
wherein the second job procedure is a job procedure in a next job group that is a job group one after a first job group in the plurality of job groups,
wherein the first job group is a job group to which the first job procedure belongs.

16. The non-transitory computer-readable storage medium according to claim 13, the processing further comprising:
transmitting a first signal to a server, the first signal corresponding to the identified first region.

17. The non-transitory computer-readable storage medium according to claim 16, the processing further comprising:
receiving, in response to the transmitting of the first signal, the new job screen from the server,
displaying the new job screen on the display in a way that each of the plurality of divided regions is transparently overlapped over the new job screen, wherein each of the plurality of divided regions is defined by a static boundary extended over whole of the new job screen.

18. The non-transitory computer-readable storage medium according to claim 13 wherein an order of each of the plurality of job screens and the one or more job procedures are changeable in accordance with a command issued from a computer different from the processor.

* * * * *